(12) United States Patent
Ishiyama et al.

(10) Patent No.: US 12,196,992 B2
(45) Date of Patent: Jan. 14, 2025

(54) LAMINATE, LAMINATE WITH PRESSURE-SENSITIVE ADHESIVE LAYER, POLARIZING PLATE, AND IMAGE DISPLAY DEVICE

(71) Applicant: FUJIFILM Corporation, Tokyo (JP)

(72) Inventors: Jun Ishiyama, Kanagawa (JP); Kunihiro Atsumi, Kanagawa (JP); Ayako Muramatsu, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 18/488,739

(22) Filed: Oct. 17, 2023

(65) Prior Publication Data

US 2024/0085606 A1  Mar. 14, 2024

Related U.S. Application Data

(63) Continuation of application No. PCT/JP2022/017580, filed on Apr. 12, 2022.

(30) Foreign Application Priority Data

Apr. 20, 2021 (JP) ................................. 2021-071151

(51) Int. Cl.
| | |
|---|---|
| *G02F 1/13363* | (2006.01) |
| *B32B 7/023* | (2019.01) |
| *G02B 5/30* | (2006.01) |
| *G02F 1/1335* | (2006.01) |

(52) U.S. Cl.
CPC ............ *G02B 5/3016* (2013.01); *B32B 7/023* (2019.01); *G02F 1/133541* (2021.01); *G02F 1/133631* (2021.01); *G02F 1/133633* (2021.01); *G02F 1/133634* (2013.01); *G02F 1/133638* (2021.01); *B32B 2307/42* (2013.01); *G02F 2202/28* (2013.01)

(58) Field of Classification Search
CPC ......... G02F 1/133633; G02F 1/133541; G02B 5/3016; B32B 7/023; B32B 2307/42
See application file for complete search history.

(56) References Cited

U.S. PATENT DOCUMENTS

| | | | |
|---|---|---|---|
| 2009/0068379 A1* | 3/2009 | Seki ................... | G02F 1/13363 525/410 |
| 2015/0022764 A1 | 1/2015 | Takeda et al. | |
| 2015/0042943 A1 | 2/2015 | Hatanaka et al. | |
| 2016/0326288 A1 | 11/2016 | Nakahara et al. | |
| 2019/0353957 A1* | 11/2019 | Atsumi ..................... | G09F 9/30 |
| 2020/0012147 A1* | 1/2020 | Osato ....................... | G02B 1/111 |
| 2020/0012156 A1 | 1/2020 | Fujiwara et al. | |
| 2020/0079885 A1 | 3/2020 | Tamura et al. | |
| 2020/0369961 A1* | 11/2020 | Muramatsu ............... | C08F 2/50 |

FOREIGN PATENT DOCUMENTS

| | | | |
|---|---|---|---|
| JP | 2010-204347 A | | 9/2010 |
| JP | 2011-242723 A | | 12/2011 |
| JP | 2013-235232 A | | 11/2013 |
| JP | 2015-163935 A | | 9/2015 |
| JP | 2016-173581 A | | 9/2016 |
| JP | 2021-002026 A | | 1/2021 |
| JP | 2021047229 A | * | 3/2021 |
| JP | 2021-054909 A | | 4/2021 |
| WO | 2015/107954 A1 | | 7/2015 |
| WO | 2018/173773 A1 | | 9/2018 |
| WO | 2018/216812 A1 | | 11/2018 |
| WO | 2019/188519 A1 | | 10/2019 |
| WO | 2021/060428 A1 | | 4/2021 |
| WO | 2021/176989 A1 | | 9/2021 |

OTHER PUBLICATIONS

International Search Report issued in PCT/JP2022/017580 on Jul. 5, 2022.
Written Opinion issued in PCT/JP2022/017580 on Jul. 5, 2022.
International Preliminary Report on Patentability completed by WIPO on Oct. 24, 2023 in connection with International Patent Application No. PCT/JP2022/017580.

* cited by examiner

*Primary Examiner* — Paisley L Wilson
(74) *Attorney, Agent, or Firm* — Edwards Neils LLC; Jean C. Edwards, Esq.

(57) ABSTRACT

A laminate in which the occurrence of cracks is suppressed, and a laminate with a pressure-sensitive adhesive layer, a polarizing plate, and an image display device which use the laminate. The laminate includes a first optically anisotropic layer; and a second optically anisotropic layer, the first optically anisotropic layer and the second optically anisotropic layer being laminated directly or through an alignment film, in which the first optically anisotropic layer satisfies Expression (A) nx>ny, the second optically anisotropic layer satisfies Expression (B) nx<nz, the laminate satisfies Expressions (1) 100 nm≤Re(550)≤180 nm, Expression (2) Re(450)/Re(550)<1.0, Expression (3) Re(650)/Re(550)>1.0, Expression (4) −40 nm≤Rth(550)≤70 nm, and Expression (5) Rth(550)<Re(550)/2, and an endothermic peak temperature of the laminate observed by differential scanning calorimetry is 125° C. or lower.

10 Claims, No Drawings

LAMINATE, LAMINATE WITH PRESSURE-SENSITIVE ADHESIVE LAYER, POLARIZING PLATE, AND IMAGE DISPLAY DEVICE

CROSS-REFERENCE TO RELATED APPLICATIONS

This application is a Continuation of PCT International Application No. PCT/JP2022/017580 filed on Apr. 12, 2022, which was published under PCT Article 21 (2) in Japanese, and which claims priority under 35 U.S.C. § 119 (a) to Japanese Patent Application No. 2021-071151 filed on Apr. 20, 2021. The above applications are hereby expressly incorporated by reference, in their entirety, into the present application.

BACKGROUND OF THE INVENTION

1. Field of the Invention

The present invention relates to a laminate, a laminate with a pressure-sensitive adhesive layer, a polarizing plate, and an image display device.

2. Description of the Related Art

Optical films such as optical compensation sheets or retardation films are used in various image display devices from the viewpoint of solving image staining or enlarging a view angle.

A stretched birefringence film has been used as an optical film, but in recent years, it has been proposed to use an optically anisotropic layer formed of a liquid crystal compound in place of the stretched birefringence film.

Further, a laminate obtained by attaching two such optically anisotropic layers together through an adhesive has been known, and from the viewpoint of thinning and cost reduction, it is desirable to reduce the number of times of attachment.

For example, JP2015-163935A describes an aspect in which a first optically anisotropic layer and a second optically anisotropic layer are laminated through an alignment film, and WO2018/216812A describes an aspect in which a first optically anisotropic layer and a second optically anisotropic layer are directly laminated.

SUMMARY OF THE INVENTION

The present inventors have conducted studies on the laminates described in JP2015-163935A and WO2018/216812A, that is, laminates obtained by laminating a first optically anisotropic layer and a second optically anisotropic layer directly or through an alignment film, and found out that cracks may occur in a case where the laminate is exposed to a sudden change in temperature (for example, a heat shock resistance test).

An object of the present invention is to provide a laminate in which the occurrence of cracks is suppressed, and a laminate with a pressure-sensitive adhesive layer, a polarizing plate, and an image display device which use the laminate.

The present inventors have conducted intensive studies in order to achieve the above object, and as a result, found that in a case where a laminate obtained by laminating a predetermined first optically anisotropic layer and a predetermined second optically anisotropic layer directly or through an alignment film has an endothermic peak temperature of 125° C. or lower, the occurrence of cracks is suppressed, and completed the present invention.

That is, the inventors have found that the object can be achieved with the following configuration.

[1] A laminate comprising: a first optically anisotropic layer; and a second optically anisotropic layer, the first optically anisotropic layer and the second optically anisotropic layer being laminated directly or through an alignment film,
in which the first optically anisotropic layer satisfies Expression (A),
the second optically anisotropic layer satisfies Expression (B),
the laminate satisfies Expressions (1) to (5), and
an endothermic peak temperature of the laminate observed by differential scanning calorimetry is 125° C. or lower.

$$nx > ny \quad \text{Expression (A)}$$

$$nx < nz \quad \text{Expression (B)}$$

$$100 \text{ nm} \leq Re(550) \leq 180 \text{ nm} \quad \text{Expression (1)}$$

$$Re(450)/Re(550) < 1.0 \quad \text{Expression (2)}$$

$$Re(650)/Re(550) > 1.0 \quad \text{Expression (3)}$$

$$-40 \text{ nm} \leq Rth(550) \leq 70 \text{ nm} \quad \text{Expression (4)}$$

$$Rth(550) < Re(550)/2 \quad \text{Expression (5)}$$

Here, in Expressions (A) and (B), nx represents, in an index ellipsoid formed of an optically anisotropic layer, a principal refractive index in a direction parallel to the plane of the optically anisotropic layer, ny represents a refractive index in a direction parallel to the plane of the optically anisotropic layer and perpendicular to the direction of nx, and nz represents a refractive index in a direction perpendicular to the plane of the optically anisotropic layer.

In addition, in Expressions (1) to (5), Re(450) represents an in-plane retardation at a wavelength of 450 nm, Re(550) represents an in-plane retardation at a wavelength of 550 nm, Re(650) represents an in-plane retardation at a wavelength of 650 nm, and Rth(550) represents a thickness direction retardation at a wavelength of 550 nm.

[2] The laminate according to [1], in which at least one of the first optically anisotropic layer or the second optically anisotropic layer is a layer formed of a liquid crystal composition containing a liquid crystal compound and a polymerizable compound,
the liquid crystal compound is a liquid crystal compound having reverse wavelength dispersibility, and
the polymerizable compound is a polymerizable compound having one or two polymerizable groups and having no ring structure or one ring structure in a molecule.

[3] The laminate according to [2], in which the polymerizable compound has a molecular weight of 150 or greater and 1,000 or less.

[4] The laminate according to [2] or [3], in which an I/O value of the polymerizable compound is 0.8 or less.

[5] The laminate according to any one of [1] to [4], in which the first optically anisotropic layer is a positive A plate.

[6] The laminate according to any one of [1] to [5], in which the second optically anisotropic layer is a positive C plate.

[7] A laminate with a pressure-sensitive adhesive layer, comprising: the laminate according to any one of [1] to [6]; and a pressure-sensitive adhesive layer laminated on both surfaces of the laminate.

[8] The laminate with a pressure-sensitive adhesive layer according to [7], in which at least one of the pressure-sensitive adhesive layers is a pressure-sensitive adhesive layer having a storage elastic modulus of 0.1 MPa or greater at 25° C.

[9] A polarizing plate comprising: the laminate according to any one of [1] to [6] or the laminate with a pressure-sensitive adhesive layer according to [7] or [8]; and a polarizer.

[10] An image display comprising: the laminate according to any one of [1] to [6] or the laminate with a pressure-sensitive adhesive layer according to [7] or [8]; or the polarizing plate according to [9].

According to an aspect of the present invention, it is possible to provide a laminate in which the occurrence of cracks is suppressed, and a laminate with a pressure-sensitive adhesive layer, a polarizing plate, and an image display device which use the laminate.

DESCRIPTION OF THE PREFERRED EMBODIMENTS

Hereinafter, the present invention will be described in detail.

The following description of constituent requirements is based on representative embodiments of the present invention, but the present invention is not limited to the embodiments.

In this specification, a numerical range expressed using "to" means a range including numerical values before and after "to" as a lower limit and an upper limit.

In addition, in this specification, as each component, a substance corresponding to each component may be used alone, or two or more types of substances may be used in combination. Here, in a case where two or more types of substances are used in combination for each component, the content of the component refers to a total content of the substances used in combination unless otherwise specified.

In addition, in this specification, "(meth)acrylate" represents a notation of "acrylate" or "methacrylate", "(meth)acryl" represents a notation of "acryl" or "methacryl", and "(meth)acryloyl" represents a notation of "acryloyl" or "methacryloyl".

In this specification, $Re(\lambda)$ and $Rth(\lambda)$ represent an in-plane retardation at a wavelength $\lambda$ and a thickness direction retardation at a wavelength $\lambda$, respectively. Unless otherwise specified, the wavelength $\lambda$ is 550 nm.

In the present invention, $Re(\lambda)$ and $Rth(\lambda)$ are values measured at a wavelength $\lambda$ in AxoScan, manufactured by Axometrics, Inc. By inputting an average refractive index $((nx+ny+nz)/3)$ and a film thickness (d (μm)) by AxoScan, Slow Axis Direction (°)

$Re(\lambda)=R0(\lambda)$ $Rth(\lambda)=((nx+ny)/2-nz) \times d$ are calculated.

$R0(\lambda)$ is displayed as a numerical value calculated by AxoScan, and means $Re(\lambda)$.

In this specification, refractive indices nx, ny, and nz are measured using an Abbe's refractometer (NAR-4T, manufactured by Atago Co., Ltd.) and a sodium lamp ($\lambda$=589 nm) as a light source. In addition, in the measurement of wavelength dependency, the wavelength dependency can be measured by a multi-wavelength Abbe refractometer DR-M2 (manufactured by ATAGO CO., LTD.) in combination with a dichroic filter.

In addition, values in Polymer Handbook (JOHN WILEY & SONS, INC) and catalogs of various optical films can be used. Examples of the average refractive indices of main optical films are as follows: cellulose acylate (1.48), cycloolefin polymer (1.52), polycarbonate (1.59), polymethylmethacrylate (1.49), and polystyrene (1.59).

[Laminate]

A laminate according to the embodiment of the present invention is a laminate obtained by laminating a first optically anisotropic layer and a second optically anisotropic layer directly or through an alignment film, in which the first optically anisotropic layer satisfies Expression (A) and the second optically anisotropic layer satisfies Expression (B).

In addition, the laminate according to the embodiment of the present invention is a laminate satisfying Expressions (1) to (5).

In addition, the laminate according to the embodiment of the present invention is a laminate in which an endothermic peak temperature observed by differential scanning calorimetry is 125° C. or lower.

| | |
|---|---|
| $nx>ny$ | Expression (A) |
| $nx<nz$ | Expression (B) |
| 100 nm≤$Re(550)$≤180 nm | Expression (1) |
| $Re(450)/Re(550)<1.0$ | Expression (2) |
| $Re(650)/Re(550)>1.0$ | Expression (3) |
| −40 nm≤$Rth(550)$≤70 nm | Expression (4) |
| $Rth(550)<Re(550)/2$ | Expression (5) |

Here, in Expressions (A) and (B), nx represents, in an index ellipsoid formed of an optically anisotropic layer, a principal refractive index in a direction parallel to the plane of the optically anisotropic layer, ny represents a refractive index in a direction parallel to the plane of the optically anisotropic layer and perpendicular to the direction of nx, and nz represents a refractive index in a direction perpendicular to the plane of the optically anisotropic layer.

In addition, in Expressions (1) to (5), Re(450) represents an in-plane retardation at a wavelength of 450 nm, Re(550) represents an in-plane retardation at a wavelength of 550 nm, Re(650) represents an in-plane retardation at a wavelength of 650 nm, and Rth(550) represents a thickness direction retardation at a wavelength of 550 nm.

In the present invention, as described above, the endothermic peak temperature observed in the laminate obtained by laminating the first optically anisotropic layer satisfying Expression (A) and the second optically anisotropic layer satisfying Expression (B) directly or through an alignment film is 125° C. or lower, and thus the occurrence of cracks can be suppressed.

Details thereof are unclear, but are assumed to be as below by the present inventors.

That is, in a case where the endothermic peak temperature of the laminate is 125° C. or lower, at least one of the first optically anisotropic layer or the second optically anisotropic layer softens to some extent with respect to the contraction of the laminate occurring due to rapid cooling from high temperature (for example, about 70° C.). Therefore, distortion can be mitigated, and as a result, it is thought that the occurrence of cracks can be suppressed.

As described above, the laminate according to the embodiment of the present invention is a laminate satisfying Expressions (1) to (5).

$$100 \text{ nm} \leq Re(550) \leq 180 \text{ nm} \quad \text{Expression (1)}$$

$$Re(450)/Re(550)<1.0 \quad \text{Expression (2)}$$

$$Re(650)/Re(550)>1.0 \quad \text{Expression (3)}$$

$$-40 \text{ nm} \leq Rth(550) \leq 70 \text{ nm} \quad \text{Expression (4)}$$

$$Rth(550)<Re(550)/2 \quad \text{Expression (5)}$$

Here, satisfying Expression (1) means that the laminate according to the embodiment of the present invention functions as a λ/4 plate. Re(550) is preferably 120 to 160 nm, and more preferably 130 to 150 nm. Here, the "λ/4 plate" is a plate having a λ/4 function, and specifically, a plate having a function of converting linearly polarized light with a specific wavelength into circularly polarized light (or converting circularly polarized light into linearly polarized light).

In addition, satisfying Expressions (2) and (3) means that the laminate according to the embodiment of the present invention exhibits reverse wavelength dispersibility, that is, the Re value increases as the measurement wavelength increases.

In addition, satisfying Expressions (4) and (5) means that the reflectivity and change in hue of the laminate according to the embodiment of the present invention in an oblique direction can be reduced.

In addition, as described above, the laminate according to the embodiment of the present invention is a laminate in which an endothermic peak temperature observed by differential scanning calorimetry is 125° C. or lower.

Here, the observation of the endothermic peak temperature by differential scanning calorimetry (DSC) is performed through the following determination method and measurement method.

<Determination of Endothermic Peak Temperature>

The endothermic peak temperature of the laminate is determined based on DDSC that is a differential curve of a temperature rise curve of DSC.

Specifically, a temperature at which the maximum value of the DDSC curve is shown is determined as the endothermic peak temperature.

In a case where the DDSC is used, regardless of the presence or absence or degree of the inclination of the baseline of the temperature rise curve of the DSC, the DDSC reaches a maximum in the vicinity of an endothermic initiation temperature in a case where there is an endothermic peak.

In addition, since the baseline is unstable during first temperature rise in the DSC measurement, the determination is made during second temperature rise. In a case where first temperature drop and second temperature rise are repeated at room temperature, a peak may appear up to 70° C., but a peak in a temperature range lower than 70° C. may be ignored.

<Measurement Method>

A sample of the laminate is recovered and measured under the following conditions using a differential scanning calorimeter (device name: X-DSC7000, manufactured by Hitachi High-Tech Corporation), Sample amount: 2 to 3 mg
Reference: alumina
Introduced gas: nitrogen
Temperature range: room temperature to 200° C.
Rate of temperature rise: 20° C./min In a case where the laminate and the pressure-sensitive adhesive layer cannot be completely separated from each other, it is necessary to increase a sample recovery amount to secure the measurement sensitivity. For example, in a case where the pressure-sensitive adhesive layer is about 10 times thicker than the laminate, the sample amount is set to 20 to 30 mg. Since the glass transition temperature of the pressure-sensitive adhesive is lower than 70° C., it does not affect the determination of the endothermic temperature peak.

In the present invention, for the reasons that the endothermic peak temperature of the laminate is easily adjusted to 125° C. or lower and the occurrence of cracks can be further suppressed, it is preferable that at least one of the first optically anisotropic layer or the second optically anisotropic layer is an optically anisotropic layer (hereinafter, also abbreviated as "specific optically anisotropic layer") which is a layer formed of a liquid crystal composition containing a liquid crystal compound and a polymerizable compound, and in which the liquid crystal compound is a liquid crystal compound having reverse wavelength dispersibility, and the polymerizable compound is a polymerizable compound having one or two polymerizable groups and having no ring structure or one ring structure in the molecule. It is more preferable that among the first optically anisotropic layer and the second optically anisotropic layer, at least the first optically anisotropic layer is a specific optically anisotropic layer.

Here, the liquid crystal compound having "reverse wavelength dispersibility" means that in the measurement of an in-plane retardation (Re) value at a specific wavelength (visible light range) of a retardation film produced using the liquid crystal compound, as the measurement wavelength increases, the Re value is the same or increased.

<Liquid Crystal Compound Having Reverse Wavelength Dispersibility>

The liquid crystal compound having reverse wavelength dispersibility is not particularly limited, and examples thereof include compounds represented by General Formula (1) described in JP2010-084032A (particularly, compounds described in paragraphs [0067] to [0076], compounds represented by General Formula (II) described in JP2016-053709A (particularly, compounds described in paragraphs [0036] to [0043]), compounds represented by General Formula (1) described in JP2016-081035A (particularly, compounds described in paragraphs [0043] to [0055]), compounds represented by General Formula (1) described in WO2019/017444A (particularly, compounds described in paragraphs [0015] to [0036]), and compounds represented by General Formula (1) described in WO2019/017445A (particularly, compounds described in paragraphs [0015] to [0034]).

<Polymerizable Compound>

As described above, the polymerizable compound is a compound (hereinafter, also abbreviated as "specific polymerizable monomer") having one or two polymerizable groups and having no ring structure or one ring structure in the molecule.

Here, the type of the polymerizable group is not particularly limited, and the polymerizable group is preferably a functional group capable of an addition polymerization reaction, and more preferably a polymerizable ethylenically unsaturated group. Examples of the polymerizable group include a (meth)acryloyl group, a vinyl group, a styryl group, a (meth)acrylamide group, and an allyl group. Among these, a (meth)acryloyl group is preferable.

In addition, examples of the ring structure include an aromatic hydrocarbon ring, an aromatic heterocyclic ring, and an aliphatic hydrocarbon ring optionally having some heteroatoms as ring members.

Examples of the aromatic hydrocarbon ring include a benzene ring.

Examples of the aromatic heterocyclic ring include a furan ring, a pyrrole ring, a thiophene ring, a pyridine ring, a thiazole ring, and a benzothiazole ring.

Examples of the aliphatic hydrocarbon ring include a cycloalkane ring such as a cyclohexane ring, a cycloheptane ring, a cyclooctane ring, a cyclododecane ring, and a cyclodocosane ring.

In the present invention, for the reason that the compatibility with the liquid crystal compound is improved, the molecular weight of the specific polymerizable monomer is preferably 150 or greater and 1000 or less, more preferably 150 or greater and 500 or less, even more preferably 150 or greater and 320 or less, and particularly preferably 150 or greater and 300 or less.

In addition, in the present invention, the I/O value of the specific polymerizable monomer is preferably 0.8 or less, and more preferably 0.6 or less for the reason that the durability (particularly, moisture-heat resistance) of the laminate according to the embodiment of the present invention is improved.

Here, the "I/O value" is used as one unit for predicting various physicochemical properties of an organic compound. The magnitude of organicity is obtained by performing a comparison on the number of carbon atoms, and the magnitude of inorganicity is obtained by performing a comparison between the boiling points of hydrocarbons with the same number of carbon atoms. For example, the organicity value of one (—$CH_2$—) (actually C) is determined as 20 and the inorganicity value is determined as 100 from an influence of a hydroxyl group (—OH) on the boiling point. Based on the inorganicity value of (—OH) of 100, values of other substituents (inorganic groups) are obtained, which are shown as an "inorganic group table". The ratio I/O of inorganicity value (I) to organicity value (O) obtained for each molecule according to the inorganic group table is defined as "I/O value". It is shown that the larger the I/O value, the higher the hydrophilicity, and the smaller the I/O value, the stronger the hydrophobicity.

In the present invention, the "I/O value" is a value of "inorganicity (I)/organicity (O)" obtained by a method described in "YOSHIO KOUDA et al., "New edition Organic Conceptual Diagram Foundation and Application", November 2008, SANKYO PUBLISHING".

Among the specific polymerizable monomers, examples of the compound having one polymerizable group include a compound represented by Formula (IA), and examples of the compound having two polymerizable groups include a compound represented by Formula (IB).

P—R      Formula (IA)

P-L-P      Formula (IB)

Here, in (IA) and (IB), P represents the above-described polymerizable group.

In addition, in Formula (IA), R represents an alkyl group optionally including an oxygen atom, an aromatic hydrocarbon group, or a combination thereof. Examples of the alkyl group include a linear alkyl group having 1 to 20 carbon atoms and a branched or cyclic alkyl group having 3 to 20 carbon atoms. Examples of the aromatic hydrocarbon group include a phenyl group.

In addition, in Formula (IB), L represents an alkylene group optionally including an oxygen atom. Examples of the alkylene group include a linear alkylene group having 1 to 18 carbon atoms and a branched alkylene group having 3 to 18 carbon atoms.

Among the specific polymerizable monomers, examples of the compound having one polymerizable group include:

N-vinyl compounds such as N-vinyl caprolactam and N-vinylpyrrolidone;

monofunctional acrylate compounds such as 2-phenoxyethyl acrylate, benzyl acrylate, cyclic trimethylolpropane formal acrylate, isobornyl acrylate, tetrahydrofurfuryl acrylate, 2-(2-ethoxyethoxy)ethyl acrylate, octyl acrylate, decyl acrylate, tridecyl acrylate, isodecyl acrylate, lauryl acrylate, 3,3,5-trimethylcyclohexyl acrylate, dicyclopentenyl acrylate, 4-t-butylcyclohexyl acrylate, cyclohexyl acrylate, caprolactone-modified acrylate, hydroxyethyl acrylate, hydroxybutyl acrylate, polyethylene glycol acrylate, polypropylene glycol acrylate, nonylphenoxy polyethylene glycol acrylate, and nonylphenoxy polypropylene glycol acrylate;

monofunctional methacrylate compounds such as 2-phenoxyethyl methacrylate, benzyl methacrylate, isobornyl methacrylate, tetrahydrofurfuryl methacrylate, 2-(2-ethoxyethoxy)ethyl methacrylate, octyl methacrylate, decyl methacrylate, tridecyl methacrylate, isodecyl methacrylate, lauryl methacrylate, 3,3,5-trimethylcyclohexyl methacrylate, dicyclopentenyl methacrylate, 4-t-butylcyclohexyl methacrylate, cyclohexyl methacrylate, caprolactone-modified methacrylate, hydroxyethyl methacrylate, hydroxybutyl methacrylate, polyethylene glycol methacrylate, polypropylene glycol methacrylate, nonylphenoxy polyethylene glycol methacrylate, and nonylphenoxy polypropylene glycol methacrylate;

monofunctional vinyl ether compounds such as normal propyl vinyl ether, isopropyl vinyl ether, normal butyl vinyl ether, isobutyl vinyl ether, 2-ethylhexyl vinyl ether, cyclohexyl vinyl ether, 2-hydroxyethyl vinyl ether, 4-hydroxybutyl vinyl ether, and cyclohexanedimethanol monovinyl ether;

monofunctional acrylamide compounds such as acrylamide, N,N-dimethylacrylamide, N,N-diethylacrylamide, acryloyl morpholine, N-isopropylacrylamide, N-hydroxyethylacrylamide, N-butylacrylamide, N-tert-butylacrylamide, N-(1,1-dimethyl-3-oxobutyl)acrylamide, N-dodecylacrylamide, and N-(butoxymethyl) acrylamide; and monofunctional methacrylamide compounds such as methacrylamide, N-phenylmthacrylamide, N-(methoxymethyl)methacrylamide, N,N-dimethylmethacrylamide, and N-tert-butylmethacrylamide.

Among the specific polymerizable monomers, examples of the compound having two polymerizable groups include:

bifunctional acrylate compounds such as hexanediol diacrylate, dipropylene glycol diacrylate, polyethylene glycol diacrylate, polypropylene glycol diacrylate, nonanediol diacrylate, decanediol diacrylate, neopentyl glycol diacrylate, polyethylene glycol-modified bisphenol A diacrylate, dioxane glycol diacrylate, cyclohexanedimethanol diacrylate, and tricyclodecanedimethanol diacrylate;

2-(2-vinyloxyethoxy)ethyl acrylate;
bifunctional vinyl compounds such as 1,4-butanediol divinyl ether, cyclohexanedimethanol divinyl ether, diethylene glycol divinyl ether, and triethylene glycol divinyl ether; and
bifunctional methacrylate compounds such as hexanediol dimethacrylate, dipropylene glycol dimethacrylate, polyethylene glycol dimethacrylate, polypropylene glycol dimethacrylate, noneopentyl glycol dimethacrylate, and polyethylene glycol-modified bisphenol A dimethacrylate.

[First Optically Anisotropic Layer]

The first optically anisotropic layer of the laminate according to the embodiment of the present invention is an optically anisotropic layer satisfying Expression (A).

$$nx > ny \quad \text{Expression (A)}$$

Here, in Expression (A), nx represents, in an index ellipsoid formed of an optically anisotropic layer, a principal refractive index in a direction parallel to the plane of the optically anisotropic layer, and ny represents a refractive index in a direction parallel to the plane of the optically anisotropic layer and perpendicular to the direction of nx.

In addition, the "principal refractive index in a direction parallel to the plane of the optically anisotropic layer" means a refractive index in a direction (slow axis direction) in which the refractive index is maximized in the plane of the optically anisotropic layer.

<Liquid Crystal Composition>

The first optically anisotropic layer is preferably formed of a liquid crystal composition containing a liquid crystal compound, and as described above, more preferably formed of a liquid crystal composition containing a liquid crystal compound having reverse wavelength dispersibility and a specific polymerizable monomer.

(Liquid Crystal Compound)

The liquid crystal compound in the liquid crystal composition is a liquid crystal compound having a polymerizable group.

In general, liquid crystal compounds can be classified into a rod-like type and a disk-like type according to the shape thereof.

In the present invention, any liquid crystal compound can be used, but a rod-like liquid crystal compound or a discotic liquid crystal compound is preferably used, and a rod-like liquid crystal compound is more preferably used.

In the present invention, a liquid crystal compound having a polymerizable group is used in order to immobilize the above-described liquid crystal compound, but it is more preferable that the liquid crystal compound has two or more polymerizable groups in one molecule. In a case where a mixture of two or more types of liquid crystal compounds is used, at least one liquid crystal compound preferably has two or more polymerizable groups in one molecule. After immobilizing the liquid crystal compound by polymerization, it is no longer necessary to exhibit liquid crystallinity.

Here, examples of the polymerizable group are similar to those given within the description of the polymerizable compound.

As the rod-like liquid crystal compound, for example, those described in claim 1 of JP1999-513019A (JP-H11-513019A) or paragraphs [0026] to [0098] of JP2005-289980A can be preferably used, and as the discotic liquid crystal compound, for example, those described in paragraphs [0020] to [0067] of JP2007-108732A or paragraphs [0013] to [0108] of JP2010-244038A can be preferably used. However, the examples thereof are not limited thereto.

In addition, in the present invention, as the liquid crystal compound, a liquid crystal compound having reverse wavelength dispersibility can be used as described above.

The state in which the liquid crystal compound is aligned (alignment state) is not particularly limited, and examples thereof include known alignment states. Examples of the alignment state include homogeneous alignment and homeotropic alignment. In a case where the liquid crystal compound is a rod-like liquid crystal compound, more specific examples of the alignment state include nematic alignment (a state in which a nematic phase is formed), smectic alignment (a state in which a smectic phase is formed), cholesteric alignment (a state in which a cholesteric phase is formed), and hybrid alignment. In a case where the liquid crystal compound is a discotic liquid crystal compound, examples of the alignment state include nematic alignment, columnar alignment (a state in which a columnar phase is formed), and cholesteric alignment.

(Polymerization Initiator)

The liquid crystal composition preferably contains a polymerization initiator.

The polymerization initiator is not particularly limited, and examples thereof include a thermal polymerization initiator and a photopolymerization initiator depending on the method of a polymerization reaction.

The polymerization initiator is preferably a photopolymerization initiator capable of initiating a polymerization reaction by ultraviolet irradiation.

Examples of the photopolymerization initiator include an α-carbonyl compound, acyloin ether, an α-hydrocarbon-substituted aromatic acyloin compound, a polynuclear quinone compound, a combination of a triarylimidazole dimer and p-aminophenyl ketone, an acridine compound, a phenazine compound, an oxadiazole compound, an acylphosphine oxide compound, and an oxime compound.

(Solvent)

From the viewpoint of workability, the liquid crystal composition preferably contains a solvent.

Examples of the solvent include ketones (for example, acetone, 2-butanone, methyl isobutyl ketone, cyclopentanone, and cyclohexanone), ethers (for example, dioxane and tetrahydrofuran), aliphatic hydrocarbons (for example, hexane), alicyclic hydrocarbons (for example, cyclohexane), aromatic hydrocarbons (for example, toluene, xylene, and trimethylbenzene), halogenated carbons (for example, dichloromethane, dichloroethane, dichlorobenzene, and chlorotoluene), esters (for example, methyl acetate, ethyl acetate, and butyl acetate), water, alcohols (for example, ethanol, isopropanol, butanol, and cyclohexanol), cellosolves (for example, methyl cellosolve and ethyl cellosolve), cellosolve acetates, sulfoxides (for example, dimethyl sulfoxide), and amides (for example, dimethylformamide and dimethylacetamide).

The solvents may be used alone or in combination of two or more types thereof.

Examples of the method of forming the first optically anisotropic layer include a method of directly coating the second optically anisotropic layer to be described later with the above-described liquid crystal composition.

Here, the coating method is not particularly limited, and examples of the coating method include a spin coating method, an air knife coating method, a curtain coating method, a roller coating method, a wire bar coating method, a gravure coating method, and a die coating method.

In addition, examples of the method of curing the liquid crystal composition include a method including achieving a desired alignment state of the liquid crystal composition and immobilizing the alignment state by polymerization.

Here, the polymerization conditions are not particularly limited, and ultraviolet rays are preferably used in the polymerization by light irradiation. The irradiation dose is preferably 10 mJ/cm² to 50 J/cm², more preferably 20 mJ/cm² to 5 J/cm², even more preferably 30 mJ/cm² to 3 J/cm², and particularly preferably 50 to 1,000 mJ/cm². In order to promote the polymerization reaction, the treatment may be performed under heating conditions.

The thickness of the first optically anisotropic layer is not particularly limited, and is preferably 0.1 to 10 µm, and more preferably 0.5 to 5 µm.

[Second Optically Anisotropic Layer]

The second optically anisotropic layer of the laminate according to the embodiment of the present invention is an optically anisotropic layer satisfying Expression (B).

$$nx<nz \qquad \text{Expression (B)}$$

Here, in Expression (B), nx represents, in an index ellipsoid formed of an optically anisotropic layer, a principal refractive index in a direction parallel to the plane of the optically anisotropic layer, and nz represents a refractive index in a direction perpendicular to the plane of the optically anisotropic layer.

<Liquid Crystal Composition>

The second optically anisotropic layer is preferably formed of a liquid crystal composition containing a liquid crystal compound, and as described above, more preferably formed of a liquid crystal composition containing a liquid crystal compound having reverse wavelength dispersibility and a specific polymerizable monomer.

Here, examples of the liquid crystal composition for forming the second optically anisotropic layer include a composition obtained by blending the liquid crystal compound, the polymerization initiator, the solvent, and the like described in the description of the liquid crystal composition for forming the first optically anisotropic layer.

In the present invention, the method of laminating the first optically anisotropic layer and the second optically anisotropic layer described above directly or through an alignment film is not particularly limited, and examples thereof include a method in which an alignment film is directly coated on the second optically anisotropic layer (lower layer), and then the first optically anisotropic layer (upper layer) is directly coated on the alignment film, and a method in which the first optically anisotropic layer (upper layer) is directly coated on the second optically anisotropic layer (lower layer) containing a photo-alignment polymer.

In particular, for the reason that it becomes easy to directly laminate the first optically anisotropic layer and the second optically anisotropic layer described above, it is preferable that the liquid crystal composition forming the second optically anisotropic layer contains a photo-alignment polymer having a repeating unit containing a photo-alignment group.

In addition, for the reason that it becomes easier to directly laminate the first optically anisotropic layer and the second optically anisotropic layer described above, it is more preferable that the liquid crystal composition forming the second optically anisotropic layer contains a photo-alignment polymer (hereinafter, also abbreviated as "cleavage group-containing photo-alignment polymer") having a repeating unit containing a photo-alignment group and a repeating unit containing a cleavage group which decomposes by the action of at least one selected from the group consisting of light, heat, acid, and base and forms a polar group.

(Photo-Alignment Polymer)

Examples of the repeating unit containing a photo-alignment group in the photo-alignment polymer include a repeating unit represented by Formula (A) (hereinafter, also abbreviated as "repeating unit A").

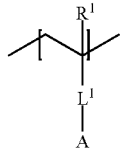

(A)

In Formula (A), R¹ represents a hydrogen atom or a substituent, L¹ represents a divalent linking group, and A represents a photo-alignment group.

Next, the hydrogen atom or substituent represented by R¹ in Formula (A) will be described.

In Formula (A), the substituent represented by one aspect of R¹ is preferably a halogen atom, a linear alkyl group having 1 to 20 carbon atoms, a branched or cyclic alkyl group having 3 to 20 carbon atoms, a linear halogenated alkyl group having 1 to 20 carbon atoms, an alkoxy group having 1 to 20 carbon atoms, an aryl group having 6 to 20 carbon atoms, an aryloxy group having 6 to 20 carbon atoms, a cyano group, or an amino group.

Next, the divalent linking group represented by L¹ in Formula (A) will be described.

For the reason that the aligning properties of the first optically anisotropic layer described above are improved, as the divalent linking group, a divalent linking group obtained by combining at least two or more groups selected from the group consisting of a linear alkylene group having 1 to 18 carbon atoms and optionally having a substituent, a branched or cyclic alkylene group having 3 to 18 carbon atoms, an arylene group having 6 to 12 carbon atoms and optionally having a substituent, an ether group (—O—), a carbonyl group (—C(=O)—), and an imino group (—NH—) optionally having a substituent is preferable.

Here, examples of the substituent which may be contained in the alkylene group, the arylene group, and the imino group include a halogen atom, an alkyl group, an alkoxy group, an aryl group, an aryloxy group, a cyano group, a carboxy group, an alkoxycarbonyl group, and a hydroxyl group.

Examples of the halogen atom include a fluorine atom, a chlorine atom, a bromine atom, and an iodine atom. Among these, a fluorine atom and a chlorine atom are preferable.

Further, the number of carbon atoms of the alkyl group is preferably 1 to 18, the number of carbon atoms of the alkoxy group is preferably 1 to 18, and the number of carbon atoms of the aryl group is preferably 6 to 12.

In the present invention, for the reason that the aligning properties of the first optically anisotropic layer described above are improved, L¹ in Formula (A) preferably represents a divalent linking group containing a cycloalkane ring, and more preferably represents a divalent linking group containing a nitrogen atom and a cycloalkane ring.

In this preferable aspect, a part of carbon atoms constituting the cycloalkane ring may be substituted with a heteroatom selected from the group consisting of nitrogen, oxygen, and sulfur. In addition, in a case where a part of carbon atoms constituting the cycloalkane ring is substituted with a nitrogen atom, no nitrogen atom may be contained separately from the cycloalkane ring.

Here, the cycloalkane ring is preferably a cycloalkane ring having 6 or more carbon atoms, and specific examples thereof include a cyclohexane ring, a cycloheptane ring, a cyclooctane ring, a cyclododecane ring, and a cyclodocosane ring.

In addition, in the present invention, for the reason that the aligning properties of the first optically anisotropic layer described above are improved, $L^1$ in Formula (A) is preferably a divalent linking group represented by any one of Formula (3), . . . , or Formula (12).

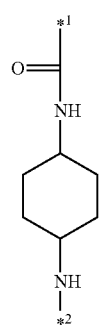

(3)

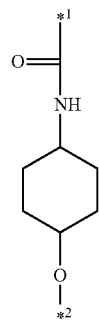

(4)

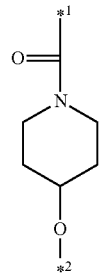

(5)

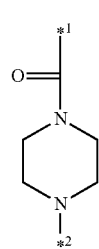

(6)

-continued

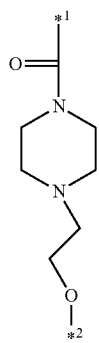

(7)

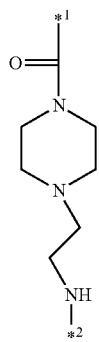

(8)

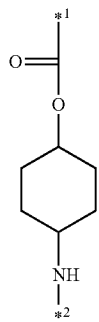

(9)

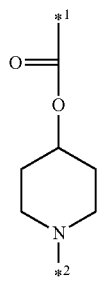

(10)

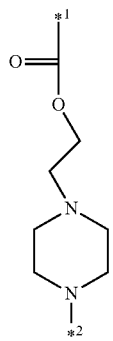

(11)

-continued

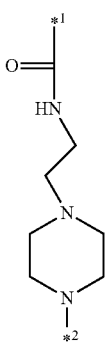

(12)

In Formulae (3) to (12), *1 represents a bonding position between $R^1$ in Formula (A) and a carbon atom bonded thereto, and *2 represents a bonding position with A in Formula (A).

Among the divalent linking groups each represented by any one of Formula (3), . . . , or Formula (12), a divalent linking group represented by any one of Formula (4), Formula (5), Formula (9), or Formula (10) is preferable for the reason that the balance between the solubility in a solvent to be used during the formation of the second optically anisotropic layer and the solvent resistance of the second optically anisotropic layer to be obtained is improved. Next, the photo-alignment group represented by A in Formula (A) will be described.

For the reason that the thermal stability and chemical stability of a monomer having a photo-alignment group are improved, the photo-alignment group is preferably a group in which at least one of dimerization or isomerization is caused by the action of light.

Specific suitable examples of the group which is dimerized by the action of light include groups having a skeleton of at least one derivative selected from the group consisting of a cinnamic acid derivative, a coumarin derivative, a chalcone derivative, a maleimide derivative, and a benzophenone derivative.

Specific suitable examples of the group which is isomerized by the action of light include groups having a skeleton of at least one compound selected from the group consisting of an azobenzene compound, a stilbene compound, a spiropyran compound, a cinnamic acid compound, and a hydrazono-β-ketoester compound.

Among such photo-alignment groups, groups having a skeleton of at least one derivative or compound selected from the group consisting of a cinnamic acid derivative, a coumarin derivative, a chalcone derivative, a maleimide derivative, an azobenzene compound, a stilbene compound, and a spiropyran compound are preferable. Among these, for the reason that the aligning properties of the first optically anisotropic layer described above are improved, groups having a skeleton of a cinnamic acid derivative or an azobenzene compound are more preferable, and groups having a skeleton of a cinnamic acid derivative (hereinafter, also abbreviated as "cinnamoyl group") are even more preferable.

In the present invention, as the photo-alignment group, photo-alignment groups described in paragraphs [0036] to [0040] of WO2020/179864A are preferable.

Further, examples of the repeating unit A represented by Formula (A) include repeating units described in paragraphs [0041] to [0049] of WO2020/179864A.

The content of the repeating unit containing a photo-alignment group in the photo-alignment polymer of the present invention is not particularly limited, and is preferably 3 to 40 mol %, more preferably 6 to 30 mol %, and even more preferably 10 to 25 mol % with respect to all the repeating units of the photo-alignment polymer for the reason that the aligning properties of the first optically anisotropic layer described above are improved.

(Repeating Unit Containing Cleavage Group)

As the repeating unit containing a cleavage group in the cleavage group-containing photo-alignment polymer, a repeating unit which contains a cleavage group which decomposes by the action of at least one selected from the group consisting of light, heat, acid, and base and forms a polar group, in a side chain, and has a fluorine atom or a silicon atom at a terminal rather than the cleavage group in a side chain is preferable.

Examples of such a repeating unit include repeating units described in paragraphs [0037] and [0038] of WO2018/216812A.

Further, a repeating unit containing a cleavage group which forms a polar group by the action of acid is preferable as such a repeating unit, and suitable specific examples thereof are as follows.

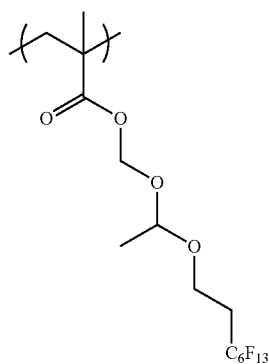

B-1

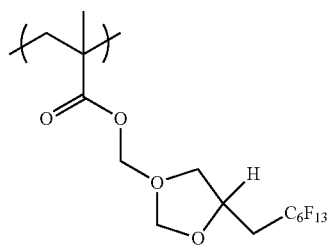

B-2

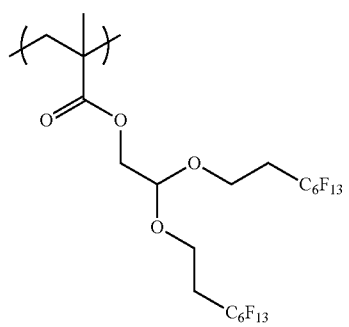

B-3

B-4
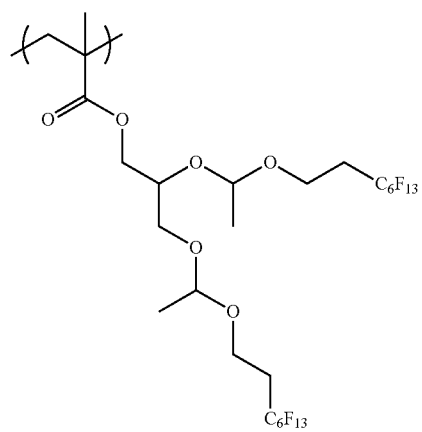
B-5
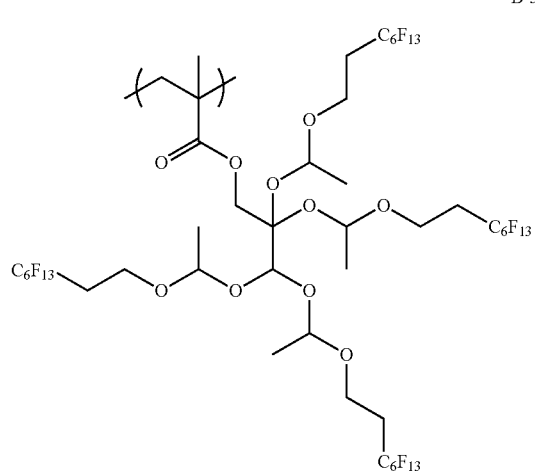
B-6
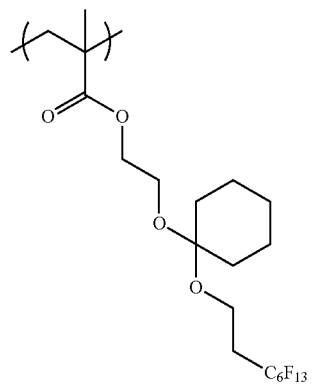
B-7
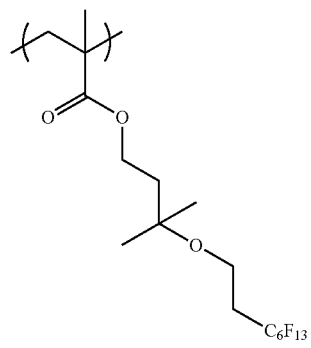
B-8
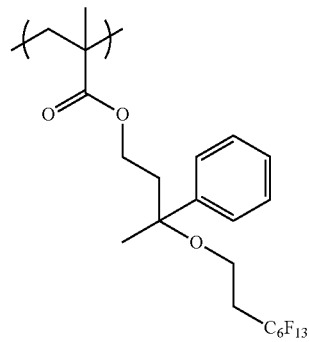
B-9
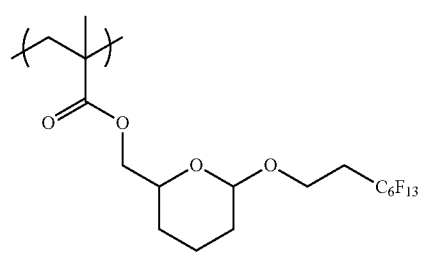
B-10
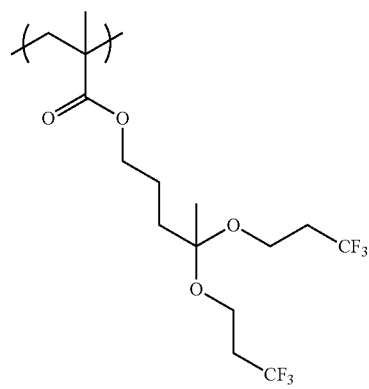
B-11
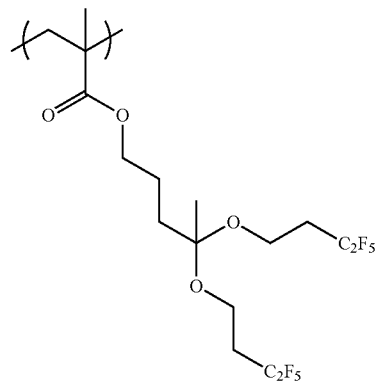

-continued

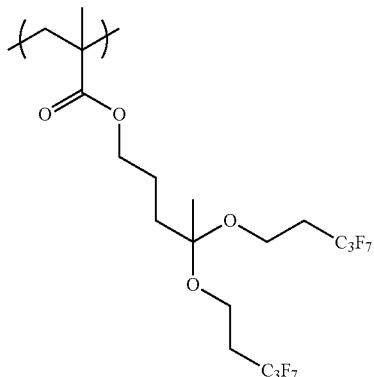

B-12

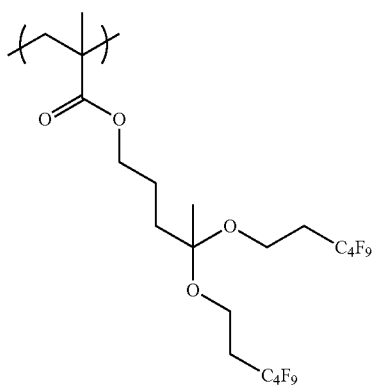

B-13

The content of the repeating unit containing a cleavage group in the photo-alignment polymer is not particularly limited, and is preferably 5 mol % or greater, more preferably 10 mol % or greater, even more preferably 15 mol % or greater, particularly preferably 20 mol % or greater, preferably 90 mol % or less, more preferably 70 mol % or less, even more preferably 50 mol % or less, particularly preferably 40 mol % or less, and most preferably 35 mol % or less with respect to all the repeating units of the photo-alignment polymer for the reason that the aligning properties of the first optically anisotropic layer described above are improved.

The photo-alignment polymer may have a repeating unit other than the above-described repeating unit.

Examples of the monomer (radically polymerizable monomer) forming a repeating unit other than the above repeating units include an acrylic acid ester compound, a methacrylic acid ester compound, a maleimide compound, an acrylamide compound, acrylonitrile, maleic anhydride, a styrene compound, and a vinyl compound.

The method of synthesizing the photo-alignment polymer is not particularly limited. For example, the photo-alignment polymer can be synthesized by mixing a monomer forming the repeating unit containing a photo-alignment group described above, a monomer forming the repeating unit containing a cleavage group described above, and monomers forming other optional repeating units, and polymerizing the monomers using a radical polymerization initiator in an organic solvent.

The weight-average molecular weight (Mw) of the photo-alignment polymer is not particularly limited, and is preferably 10,000 to 500,000, more preferably 10,000 to 300,000, and even more preferably 30,000 to 150,000.

Here, the weight-average molecular weight in the present invention is a value measured by gel permeation chromatography (GPC) under the following conditions.

Solvent (eluent): Tetrahydrofuran (THF)
Device Name: TOSOH HLC-8320GPC
Column: Three items of TOSOH TSKgel Super HZM-H (4.6 mm×15 cm) are connected and used.
Column Temperature: 40° C.
Sample Concentration: 0.1 mass %
Flow Rate: 1.0 ml/min
Calibration Curve: A calibration curve made by 7 samples of TSK standard polystyrene manufactured by TOSOH Corporation, Mw of which is 2,800,000 to 1,050 (Mw/Mn=1.03 to 1.06), is used.

(Photo-Acid Generator)

It is preferable that the liquid crystal composition forming the second optically anisotropic layer contains a photo-acid generator together with the photo-alignment polymer described above.

The photo-acid generator is not particularly limited, and is preferably a compound which is sensitive to actinic rays having a wavelength of 300 nm or greater, preferably 300 to 450 nm, and generates an acid. A photo-acid generator which is not directly sensitive to actinic rays having a wavelength of 300 nm or greater can also be preferably used in combination with a sensitizer as long as it is a compound which is sensitive to actinic rays having a wavelength of 300 nm or greater and generates an acid by being used in combination with the sensitizer.

The photo-acid generator is preferably a photo-acid generator which generates an acid with a pKa of 4 or less, more preferably a photo-acid generator which generates an acid with a pKa of 3 or less, and even more preferably a photo-acid generator which generates an acid with a pKa of 2 or less. In the present invention, the pKa basically refers to a pKa in water at 25° C. Those which cannot be measured in water refer to those measured after changing to a solvent suitable for the measurement. Specifically, the pKa described in a chemical handbook or the like can be referred to. The acid with a pKa of 3 or less is preferably a sulfonic acid or a phosphonic acid, and more preferably a sulfonic acid.

Examples of the photo-acid generator include an onium salt compound, trichloromethyl-s-triazines, a sulfonium salt, an iodonium salt, quaternary ammonium salts, a diazomethane compound, an imidosulfonate compound, and an oxime sulfonate compound. Among these, an onium salt compound, an imidosulfonate compound, or an oxime sulfonate compound is preferable, and an onium salt compound or an oxime sulfonate compound is more preferable. The photo-acid generators can be used alone or in combination of two or more types thereof.

(Other Components)

The liquid crystal composition forming the first optically anisotropic layer and the second optically anisotropic layer may contain, for example, a crosslinking agent, a surfactant, a hydrophilic compound, a vertical alignment agent, a horizontal alignment agent, an amine compound, and the like as components other than the above-described components.

The second optically anisotropic layer of the laminate according to the embodiment of the present invention is preferably a layer which is formed of the above-described liquid crystal composition, and whose surface has alignment controllability. More specifically, the second optically anisotropic layer is preferably a layer formed by generating an acid from the photo-acid generator in a coating film of the liquid crystal composition and then performing a photo-alignment treatment.

That is, in the method of forming the second optically anisotropic layer, it is preferable that a curing treatment is performed on a coating film formed of the liquid crystal composition, a treatment for generating an acid from the photo-acid generator in the coating film (hereinafter, also simply referred to as "acid generation treatment") is performed, and then a photo-alignment treatment is performed to form the optically anisotropic layer.

As will be described later, the curing treatment and the acid generation treatment may be performed at the same time.

Hereinafter, the method of performing the curing treatment will be described in detail.

The method of forming a coating film using the liquid crystal composition is not particularly limited, and examples thereof include a method including coating a support with the liquid crystal composition and optionally performing a drying treatment.

Examples of the support include a glass substrate and a polymer film.

Examples of the material of the polymer film include cellulose-based polymers; acrylic polymers having an acrylic acid ester polymer such as polymethyl methacrylate and a lactone ring-containing polymer; thermoplastic norbornene-based polymers; polycarbonate-based polymers; polyester-based polymers such as polyethylene terephthalate and polyethylene naphthalate; styrene-based polymers such as polystyrene and an acrylonitrile-styrene copolymer; polyolefin-based polymers such as polyethylene, polypropylene, and an ethylene-propylene copolymer; vinyl chloride-based polymers; amide-based polymers such as nylon and aromatic polyamide; imide-based polymers; sulfone-based polymers; polyether sulfone-based polymers; polyether ether ketone-based polymers; polyphenylene sulfide-based polymers; vinylidene chloride-based polymers; vinyl alcohol-based polymers; vinyl butyral-based polymers; arylate-based polymers; polyoxymethylene-based polymers; epoxy-based polymers; and polymers obtained by mixing these polymers.

In addition, an alignment layer may be disposed on the support. In this case, a known alignment layer such as a rubbing alignment layer or a photo-alignment layer may be used as the alignment layer, but a photo-alignment layer is preferably used from the viewpoint of suppressing alignment defects starting from shavings generated by rubbing. From the viewpoint of suppressing reticulation of the laminate, it is preferable that the laminate does not have an alignment layer immediately before a timing of formation of the laminate according to the embodiment of the present invention. Therefore, it is preferable that the alignment layer and the support are peelable.

The thickness of the support is not particularly limited, and is preferably 5 to 200 μm, more preferably 10 to 100 μm, and even more preferably 20 to 90 μm.

The method of performing coating with the liquid crystal composition is not particularly limited, and examples of the coating method include a spin coating method, an air knife coating method, a curtain coating method, a roller coating method, a wire bar coating method, a gravure coating method, and a die coating method.

Next, the curing treatment and the acid generation treatment are performed on the coating film of the liquid crystal composition.

Examples of the curing treatment include a light irradiation treatment and a heating treatment.

The conditions of the curing treatment are not particularly limited, and ultraviolet rays are preferably used in polymerization by light irradiation. The irradiation dose is preferably 10 $mJ/cm^2$ to 50 $J/cm^2$, more preferably 20 $mJ/cm^2$ to 5 $J/cm^2$, even more preferably 30 $mJ/cm^2$ to 3 $J/cm^2$, and particularly preferably 50 to 1,000 $mJ/cm^2$. In order to promote the polymerization reaction, the treatment may be performed under heating conditions.

The treatment for generating an acid from the photo-acid generator in the coating film is a treatment for generating an acid by irradiation with light to which the photo-acid generator contained in the liquid crystal composition is exposed. By performing the treatment, cleavage at the cleavage group proceeds, and the group containing a fluorine atom or a silicon atom is eliminated.

The light irradiation treatment performed in the above treatment may be a treatment in which the photo-acid generator is exposed to light, and examples thereof include an ultraviolet irradiation method. As a light source, a lamp emitting ultraviolet rays, such as a high-pressure mercury lamp and a metal halide lamp, can be used. In addition, the irradiation dose is preferably 10 $mJ/cm^2$ to 50 $J/cm^2$, more preferably 20 $mJ/cm^2$ to 5 $J/cm^2$, even more preferably 30 $mJ/cm^2$ to 3 $J/cm^2$, and particularly preferably 50 to 1,000 $mJ/cm^2$.

Regarding the curing treatment and the acid generation treatment, the acid generation treatment may be performed after the curing treatment, or the curing treatment and the acid generation treatment may be performed at the same time. In particular, in a case where the photo-acid generator and the polymerization initiator in the liquid crystal composition are exposed to light of the same wavelength, it is preferable that the curing treatment and the acid generation treatment are performed at the same time from the viewpoint of productivity.

The method for the photo-alignment treatment to be performed on the coating film of the liquid crystal composition formed as described above (including the cured film of the liquid crystal composition subjected to the curing treatment) is not particularly limited, and known methods are considered.

Examples of the photo-alignment treatment include a method of irradiating the coating film of the liquid crystal composition (including the cured film of the liquid crystal composition subjected to the curing treatment) with polarized light or irradiating the surface of the coating film with unpolarized light from an oblique direction.

In the photo-alignment treatment, the polarized light to be applied is not particularly limited. Examples thereof include linearly polarized light, circularly polarized light, and elliptically polarized light, and linearly polarized light is preferable.

In addition, the "oblique direction" in which irradiation with unpolarized light is performed is not particularly limited as long as it is a direction inclined at a polar angle θ (0°<θ<90° with respect to a normal direction of the surface of the coating film. θ can be appropriately selected according to the purpose, and is preferably 20° to 80°.

The wavelength of the polarized light or the unpolarized light is not particularly limited as long as the light is light to which the photo-alignment group is exposed. Examples thereof include ultraviolet rays, near-ultraviolet rays, and visible rays, and near-ultraviolet rays of 250 to 450 nm are preferable.

In addition, examples of the light source for the irradiation with polarized light or unpolarized light include a xenon lamp, a high-pressure mercury lamp, an ultra-high pressure mercury lamp, and a metal halide lamp. By using an interference filter, a color filter, or the like for ultraviolet rays or visible rays obtained from the light source, the wavelength range of the irradiation can be restricted. In addition, by using a polarization filter or a polarization prism for the light from these light sources, linearly polarized light can be obtained.

The integrated quantity of the polarized light or the unpolarized light is not particularly limited, and is preferably 1 to 300 mJ/cm$^2$, and more preferably 5 to 100 mJ/cm$^2$.

The illuminance of the polarized light or the unpolarized light is not particularly limited, and is preferably 0.1 to 300 mW/cm$^2$, and more preferably 1 to 100 mW/cm$^2$.

An aspect has been described in which the curing treatment and the acid generation treatment are performed before the photo-alignment treatment, but the present invention is not limited to this aspect. The curing treatment and the acid generation treatment may be performed at the same time in the photo-alignment treatment.

The thickness of the second optically anisotropic layer is not particularly limited, and is preferably 0.1 to 10 μm, and more preferably 0.5 to 5 μm.

From the viewpoint of the usefulness as a compensation layer for a circularly polarizing plate or a liquid crystal display device, it is preferable that the first optically anisotropic layer of the laminate according to the embodiment of the present invention is a positive A plate.

Furthermore, in the laminate according to the embodiment of the present invention, the second optically anisotropic layer is preferably a positive C plate from the viewpoint of optical compensation of the first optically anisotropic layer in an oblique direction.

Here, the positive A plate (A plate which is positive) and the positive C plate (C plate which is positive) are defined as follows.

In an index ellipsoid formed of an optically anisotropic layer, in a case where a principal refractive index in a direction parallel to the plane of the optically anisotropic layer is represented by nx, a refractive index in a direction parallel to the plane of the optically anisotropic layer and perpendicular to the direction of nx is represented by ny, and a refractive index in a direction perpendicular to the plane of the optically anisotropic layer is represented by nz, the positive A plate satisfies a relationship expressed as Expression (A1) and the positive C plate satisfies a relationship expressed as Expression (C1). Further, Rth of the positive A plate represents a positive value, and Rth of the positive C plate represents a negative value.

$$nx > ny \approx nz \quad \text{Expression (A1)}$$

$$nz > nx \approx ny \quad \text{Expression (C1)}$$

The symbol "≈" includes not only a case where both are exactly the same, but also a case where both are substantially the same.

Regarding the expression "substantially the same", in the positive A plate, for example, "ny≈nz" also includes a case where (ny−nz)×d (where d is a film thickness) is −10 to 10 nm, and preferably −5 to 5 nm, and "nx≈nz" also includes a case where (nx−nz)×d is −10 to 10 nm, and preferably −5 to 5 nm. In addition, in the positive C plate, for example, "nx≈ny" also includes a case where (nx−ny)×d (where d is a film thickness) is 0 to 10 nm, and preferably 0 to 5 nm.

In a case where the first optically anisotropic layer is a positive A plate, Re(550) is preferably 100 to 180 nm, more preferably 120 to 160 nm, and even more preferably 130 to 150 nm from the viewpoint of functioning as a λ/4 plate or a view angle compensation plate for a liquid crystal cell.

In a case where the second optically anisotropic layer is a positive C plate, the thickness direction retardation is not particularly limited, and the thickness direction retardation at a wavelength of 550 nm is preferably −10 to −160 nm, and more preferably −20 to −130 nm from the viewpoint that the reflectivity of the λ/4 plate in an oblique direction can be reduced, and that light leak of a view angle compensation plate for a liquid crystal cell in an oblique direction can be reduced.

[Laminate with Pressure-Sensitive Adhesive Layer]

A laminate with a pressure-sensitive adhesive layer according to the embodiment of the present invention is a laminate with a pressure-sensitive adhesive layer having: the above-described laminate according to the embodiment of the present invention; and a pressure-sensitive adhesive layer laminated on both surfaces of the laminate.

Here, the pressure-sensitive adhesive layer is preferably, for example, a substance in which a ratio (tan δ=G"/G') between a storage elastic modulus G' and a loss elastic modulus G", each measured with a dynamic viscoelastometer, is 0.001 to 1.5, and examples thereof include a so-called pressure-sensitive adhesive or a readily creepable substance.

As the pressure-sensitive adhesive which can be used for the pressure-sensitive adhesive layer, pressure-sensitive adhesives having excellent optical transparency, which have been known in the related art, can be used without particular limitation. Further, examples thereof include acrylic, urethane-based, silicone-based, or polyvinyl ether-based pressure-sensitive adhesives, active energy ray-curable pressure-sensitive adhesives, and heat-curable pressure-sensitive adhesives, but are not limited thereto.

In the present invention, for the reason that it is possible to further suppress the occurrence of cracks, at least one of the pressure-sensitive adhesive layers is preferably a pressure-sensitive adhesive layer having a storage elastic modulus of 0.1 MPa or greater at 25° C., and more preferably a pressure-sensitive adhesive layer having a storage elastic modulus of 0.1 to 10 MPa at 25° C.

Here, the storage elastic modulus at 25° C. refers to a value measured under the following conditions.

The measurement is performed in a shear mode using a viscoelastometer (device name: DVA-200, manufactured by IT Keisoku Seigyo Co., Ltd.).

Specifically, a dynamic viscoelastic spectrum is measured under the following conditions, and a storage elastic modulus G' of the pressure-sensitive adhesive layer at a temperature of 25° C. is obtained from the obtained data.

Distortion: 0.1%
Frequency: 1 Hz
Temperature: −40° C. to 150° C.
Rate of temperature rise: 2° C./min

[Polarizing Plate]

A polarizing plate according to the embodiment of the present invention has the above-described laminate or laminate with a pressure-sensitive adhesive layer according to the embodiment of the present invention, and a polarizer.

In addition, the polarizing plate according to the embodiment of the present invention can be used as a circularly polarizing plate in a case where the above-described laminate according to the embodiment of the present invention is a λ/4 plate.

In a case where the polarizing plate according to the embodiment of the present invention is used as a circularly polarizing plate, the above-described laminate according to the embodiment of the present invention (particularly, the first optically anisotropic layer) serves as a λ/4 plate (positive A plate), and the angle formed by a slow axis of the λ/4 plate and an absorption axis of the polarizer to be described later is preferably 30° to 60°, more preferably 40° to 50°, even more preferably 42° to 48°, and particularly preferably 45°.

In addition, the polarizing plate according to the embodiment of the present invention can also be used as an optical compensation film of an IPS mode or FFS mode liquid crystal display device.

In a case where the polarizing plate according to the embodiment of the present invention is used as an optical compensation film of an IPS mode or FFS mode liquid crystal display device, it is preferable that the above-described laminate according to the embodiment of the present invention is used as a laminate of a positive A plate and a positive C plate, and a slow axis of the positive A plate and an absorption axis of the polarizer to be described later are either orthogonal or parallel to each other, and specifically, it is more preferable that an angle formed by the slow axis of the positive A plate and the absorption axis of the polarizer to be described later is 0° to 5°, or 85° to 95°.

Here, the "slow axis" of the λ/4 plate or the positive A plate means a direction in which a refractive index in the plane of the λ/4 plate or the positive A plate is maximum, and the "absorption axis" of the polarizer means a direction in which the absorbance is highest.

[Polarizer]

The polarizer of the polarizing plate according to the embodiment of the present invention is not particularly limited as long as it is a member having a function of converting light into specific linearly polarized light. An absorption type polarizer or a reflective type polarizer which has been known in the related art can be used.

As the absorption type polarizer, an iodine-based polarizer, a dye-based polarizer using a dichroic dye, a polyene-based polarizer, or the like is used. The iodine-based polarizer and the dye-based polarizer include a coating type polarizer and a stretching type polarizer, and any of these is applicable. A polarizer produced by adsorbing iodine or a dichroic dye to polyvinyl alcohol and performing stretching is preferable.

Examples of the method of obtaining a polarizer by performing stretching and dyeing in a state in which a laminate film is obtained by forming a polyvinyl alcohol layer on a base include JP5048120B, JP5143918B, JP4691205B, JP4751481B, and JP4751486B. These known technologies concerning a polarizer can also be preferably used.

As the reflective type polarizer, a polarizer obtained by laminating thin films having different birefringences, a wire grid type polarizer, a polarizer obtained by combining a cholesteric liquid crystal having a selective reflection area and a ¼ wavelength plate, or the like is used.

Among these, a polarizer including a polyvinyl alcohol-based resin (a polymer including —$CH_2$—CHOH— as a repeating unit, particularly, at least one selected from the group consisting of polyvinyl alcohol and an ethylene-vinyl alcohol copolymer) is preferable from the viewpoint of more excellent adhesiveness.

In the present invention, the thickness of the polarizer is not particularly limited, and is preferably 2 μm to 60 μm, more preferably 2 μm to 30 μm, and even more preferably 2 μm to 10 μm.

[Image Display Device]

An image display device according to the embodiment of the present invention is an image display device having the laminate or the laminate with a pressure-sensitive adhesive layer according to the embodiment of the present invention, or the polarizing plate of the present invention.

A display element used in the image display device according to the embodiment of the present invention is not particularly limited, and examples thereof include a liquid crystal cell, an organic electroluminescence (hereinafter abbreviated as "EL") display panel, and a plasma display panel.

Among these, a liquid crystal cell or an organic EL display panel is preferable, and a liquid crystal cell is more preferable. That is, the image display device according to the embodiment of the present invention is preferably a liquid crystal display device using a liquid crystal cell as a display element or an organic EL display device using an organic EL display panel as a display element.

The liquid crystal cell used in the liquid crystal display device is preferably in a vertical alignment (VA) mode, an optically compensated bend (OCB) mode, an in-plane-switching (IPS) mode, a fringe-field-switching (FFS) mode, or a twisted nematic (TN) mode, but is not limited thereto.

The liquid crystal display device as an example of the image display device according to the embodiment of the present invention preferably has an aspect in which it has a polarizer, the laminate (or the laminate with a pressure-sensitive adhesive layer) according to the embodiment of the present invention, and a liquid crystal cell in this order from the visible side, and more preferably has an aspect in which it has a polarizer, the above-described positive C plate, the above-described positive A plate, and a liquid crystal cell in this order from the visible side.

Suitable examples of the organic EL display device include a device having an aspect in which it has a polarizer, the laminate (or the laminate with a pressure-sensitive adhesive layer) according to the embodiment of the present invention, and an organic EL display panel in this order from the visible side.

The organic EL display panel is a member in which a light emitting layer or a plurality of organic compound thin films including a light emitting layer is formed between a pair of electrodes, i.e., an anode and a cathode. In addition to the light emitting layer, a hole injection layer, a hole transport layer, an electron injection layer, an electron transport layer, a protective layer, and the like may be provided, and each of these layers may have a different function. Various materials can be used to form the respective layers.

EXAMPLES

Hereinafter, the present invention will be more specifically described with examples. Materials, used amounts, ratios, treatment contents, treatment procedures, and the like shown in the following examples are able to be properly changed unless the changes cause deviance from the gist of the present invention. Therefore, the range of the present invention will not be restrictively interpreted by the following examples.

Example 1

[Manufacturing of Laminate]
<Formation of Second Optically Anisotropic Layer>

The following rod-like liquid crystal compound A (83 parts by mass), the following rod-like liquid crystal compound B (15 parts by mass), the following rod-like liquid crystal compound C (2 parts by mass), an acrylate monomer (A-400, manufactured by SHIN-NAKAMURA CHEMICAL CO., LTD.) (4.2 parts by mass), the following polymer A (2 parts by mass), the following vertical alignment agent A (1.9 parts by mass), the following photopolymerization initiator A (5.1 parts by mass), the following photo-acid generator A (3 parts by mass), and the following photo-alignment polymer B (0.8 parts by mass) were dissolved in 567 parts by mass of methyl isobutyl ketone to prepare a second optically anisotropic layer forming composition 1 (hereinafter, also abbreviated as "liquid crystal composition C-1").

The prepared second optically anisotropic layer forming composition 1 was coated on a cellulose-based polymer film (TG40, manufactured by FUJIFILM Corporation) serving as a support by a #3.0 wire bar coater, heated for 2 minutes at 70° C., and irradiated with 150 mJ/cm² of ultraviolet rays with an oxygen concentration of less than 100 ppm. Then, by performing annealing for 1 minute at 120° C., a second optically anisotropic layer was formed.

The second optically anisotropic layer was a positive C plate satisfying Expression (C1) nz>nx≈ny, and had a film thickness of about 0.5 μm.

Rod-Like Liquid Crystal Compound A

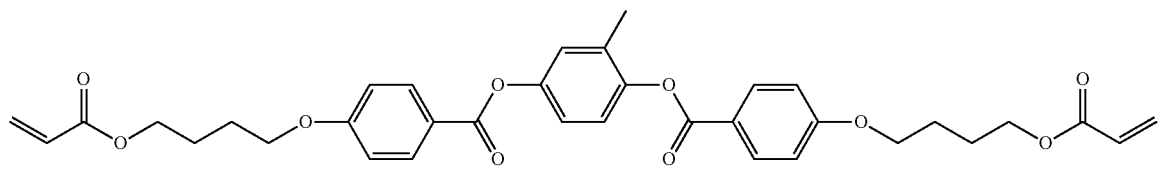 [SMILES: C=CC(=O)OCCCCOc1ccc(C(=O)Oc2ccc(OC(=O)c3ccc(OCCCCOC(=O)C=C)cc3)c(C)c2)cc1]

Rod-Like Liquid Crystal Compound B

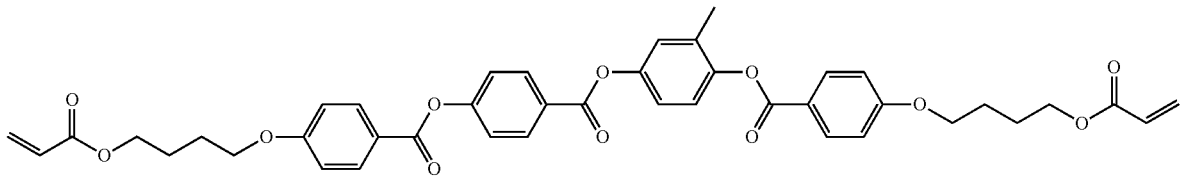 [SMILES: C=CC(=O)OCCCCOc1ccc(C(=O)Oc2ccc(C(=O)Oc3ccc(OC(=O)c4ccc(OCCCCOC(=O)C=C)cc4)c(C)c3)cc2)cc1]

Rod-Like Liquid Crystal Compound C

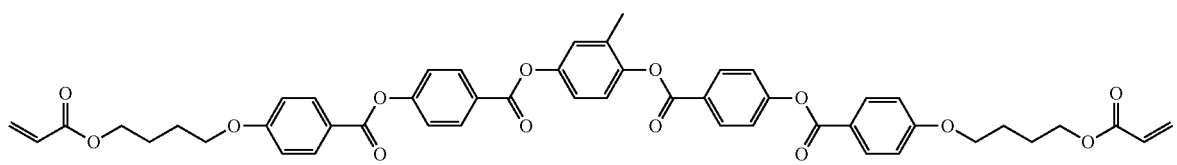 [SMILES: C=CC(=O)OCCCCOc1ccc(C(=O)Oc2ccc(C(=O)Oc3ccc(OC(=O)c4ccc(OC(=O)c5ccc(OCCCCOC(=O)C=C)cc5)cc4)c(C)c3)cc2)cc1]

Polymer A (Weight-Average Molecular Weight: 50,000)
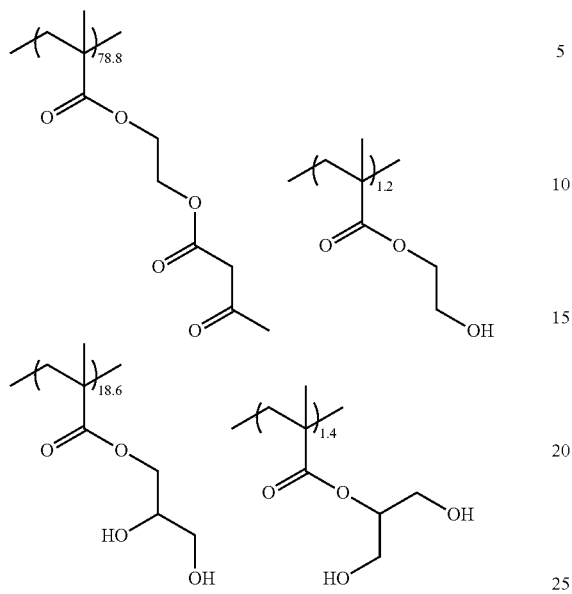
Vertical Alignment Agent A
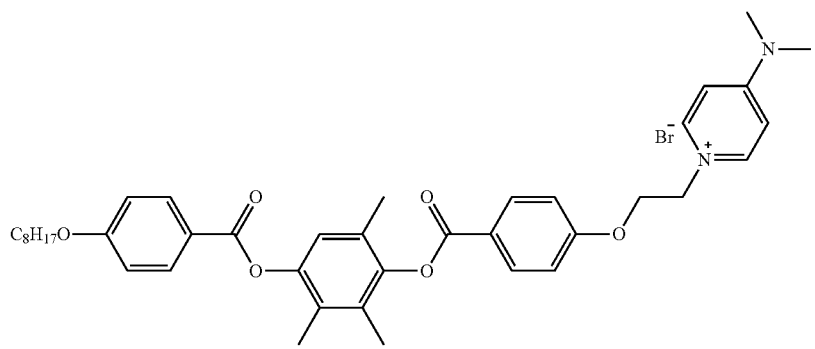
Photopolymerization Initiator A
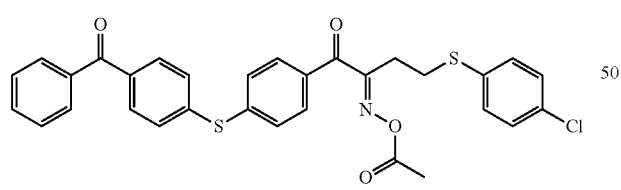
Photo-Acid Generator A
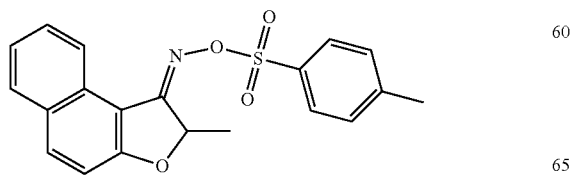
Photo-Alignment Polymer B (in the following formula: a to c are a:b:c=17:64:19, and represent the content of each repeating unit with respect to all the repeating units in the polymer. Weight-average molecular weight: 80,000)
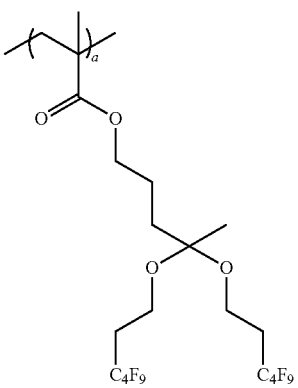

-continued

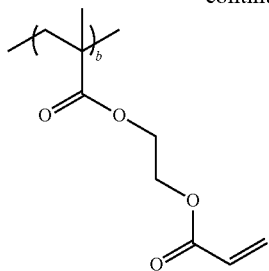

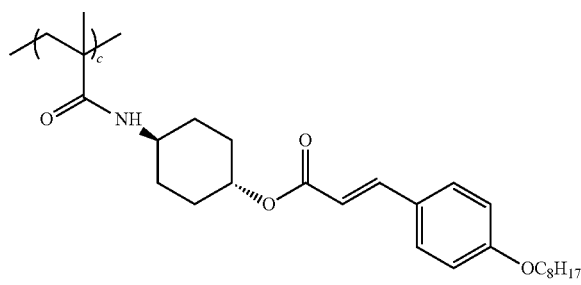

<Irradiation Step (Impartation of Alignment Function)>

The obtained second optically anisotropic layer was irradiated with 7.9 mJ/cm² of UV light (ultra-high pressure mercury lamp; UL750; manufactured by HOYA CANDEO OPTRONICS CORPORATION) (wavelength: 313 nm) passing through a wire grid polarizer at room temperature to impart an alignment function.

<Formation of First Optically Anisotropic Layer (Upper Layer)>

The above-described rod-like liquid crystal compound A (7.0 parts by mass), the above-described rod-like liquid crystal compound B (1.3 parts by mass), the above-described rod-like liquid crystal compound C (0.2 parts by mass), the following rod-like liquid crystal compound D (21.2 parts by mass), the following rod-like liquid crystal compound E (26.1 parts by mass), the following rod-like liquid crystal compound F (29.0 parts by mass), the following compound G (15.3 parts by mass), the following polymerizable compound M1 (5 parts by mass), the above-described photopolymerization initiator A (0.5 parts by mass), and the following polymer C (0.1 parts by mass) were dissolved in cyclopentanone (175 parts by mass), methyl ethyl ketone (50 parts by mass), and ethyl laurate (10 parts by mass) used as solvents to prepare a first optically anisotropic layer forming composition 1 (hereinafter, also abbreviated as "liquid crystal composition A-1").

The first optically anisotropic layer forming composition 1 was coated on the previously formed second optically anisotropic layer with a wire bar coater #7 to form a composition layer. The formed composition layer was first heated on a hot plate to 120° C. and then cooled to 60° C. to stabilize the alignment. Then, using an ultra-high pressure mercury lamp and in a nitrogen atmosphere (oxygen concentration of less than 100 ppm), first ultraviolet irradiation (80 mJ/cm²) was carried out at a film temperature kept at 60° C., and then second ultraviolet irradiation (300 mJ/cm²) was carried out at a film temperature kept at 100° C. to immobilize the alignment. A first optically anisotropic layer having a thickness of 2.8 µm was formed, and a laminate was produced. The first optically anisotropic layer was a positive A plate satisfying Expression (A1) nx>ny≈nz.

Rod-Like Liquid Crystal Compound D

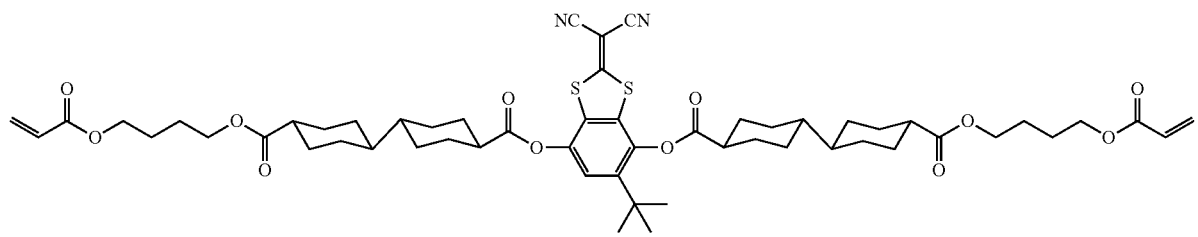 [SMILES: C=CC(=O)OCCCCOC(=O)C1CCC(C2CCC(C(=O)Oc3cc(C(C)(C)C)c(OC(=O)C4CCC(C5CCC(C(=O)OCCCCOC(=O)C=C)CC5)CC4)c4c3SC(=C(C#N)C#N)S4)CC2)CC1]

Rod-Like Liquid Crystal Compound E

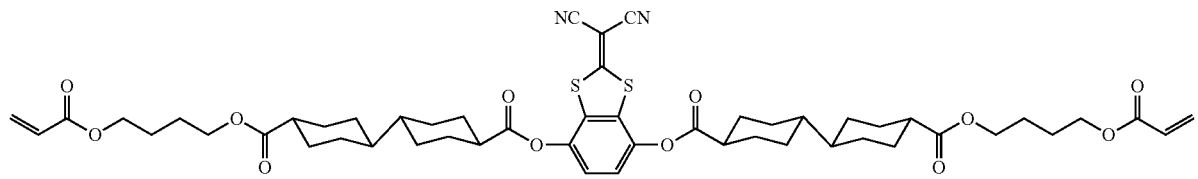 [SMILES: C=CC(=O)OCCCCOC(=O)C1CCC(C2CCC(C(=O)Oc3ccc(OC(=O)C4CCC(C5CCC(C(=O)OCCCCOC(=O)C=C)CC5)CC4)c4c3SC(=C(C#N)C#N)S4)CC2)CC1]

Rod-Like Liquid Crystal Compound F

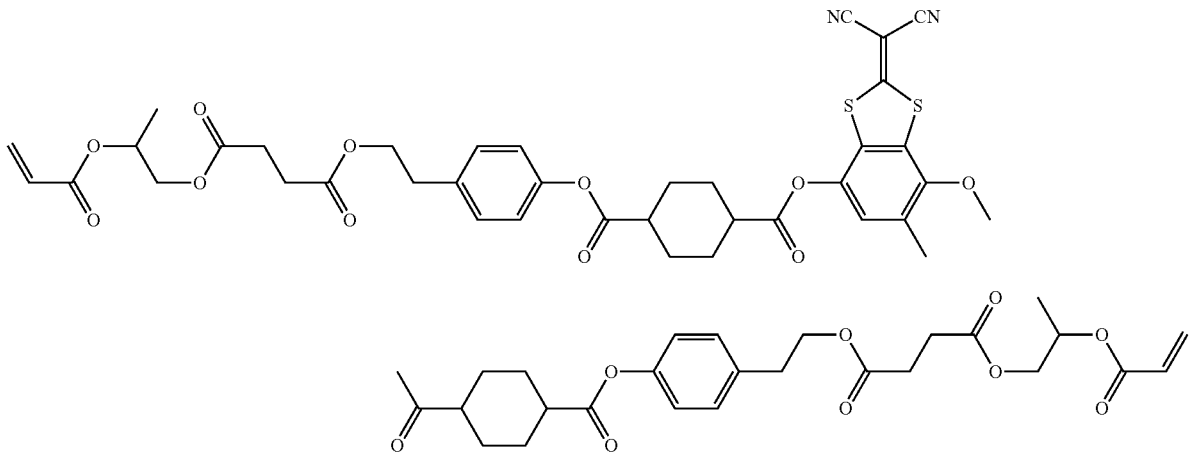 [SMILES: C=CC(=O)OC(C)COC(=O)CCC(=O)OCCc1ccc(OC(=O)C2CCC(C(=O)Oc3cc(C)c(OC)c4c3SC(=C(C#N)C#N)S4)CC2)cc1 ; C=CC(=O)OC(C)COC(=O)CCC(=O)OCCc1ccc(OC(=O)C2CCC(C(C)=O)CC2)cc1]

Compound G

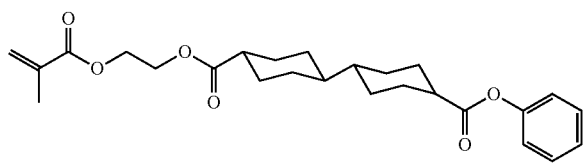 [SMILES: C=C(C)C(=O)OCCOC(=O)C1CCC(C2CCC(C(=O)Oc3ccccc3)CC2)CC1]

Polymerizable Compound M1

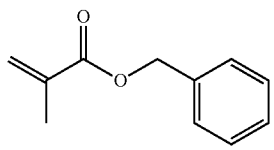

Polymer C (Weight-Average Molecular Weight: 25,000)

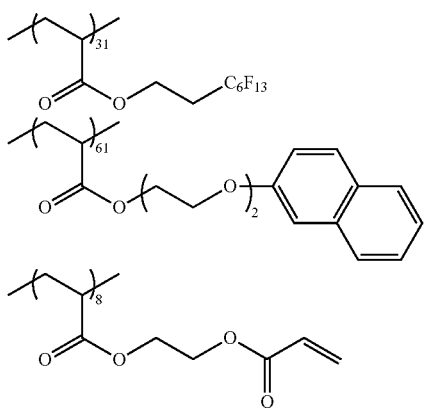

[Manufacturing of Laminate with Pressure-Sensitive Adhesive Layer]

The produced laminate was cut into a size of 40 mm×40 mm.

Next, a glass plate (EAGLE XG, manufactured by Corning Inc.) was attached to a surface of the laminate opposite to the support (TG40, manufactured by FUJIFILM Corporation) through a pressure-sensitive adhesive (SK2057, manufactured by Soken Chemical & Engineering Co., Ltd.), and the support was peeled off.

Next, to the surface from which the support was peeled off, a glass plate (EAGLE XG, manufactured by Corning Inc.) was attached through a pressure-sensitive adhesive (SK2057, manufactured by Soken Chemical & Engineering Co., Ltd.), and subjected to an autoclave treatment (5 atm, 50° C., 30 minutes) to produce a laminate with a pressure-sensitive adhesive layer having a glass plate.

Examples 2 to 11 and Comparative Examples 1 and 6

Laminates and laminates with a pressure-sensitive adhesive layer were produced in the same manner as in Example 1, except that the polymerizable compound M1 contained in the liquid crystal composition A-1 for forming the first optically anisotropic layer was changed to compounds shown in Table 1.

Examples 12 to 15

Laminates and laminates with a pressure-sensitive adhesive layer were produced in the same manner as in Example 1, except that the liquid crystal composition A-1 for forming the first optically anisotropic layer was changed to the following liquid crystal composition A-2.

| Liquid Crystal Composition A-2 | |
|---|---|
| The above-described rod-like liquid crystal compound A | 2.1 parts by mass |
| The above-described rod-like liquid crystal compound B | 0.3 parts by mass |
| The above-described rod-like liquid crystal compound C | 0.1 parts by mass |
| The above-described rod-like liquid crystal compound D | 21.2 parts by mass |
| The above-described rod-like liquid crystal compound E | 26.1 parts by mass |
| The above-described rod-like liquid crystal compound F | 29.0 parts by mass |
| The above-described Compound G | 15.3 parts by mass |
| The following rod-like liquid crystal compound H | 6 parts by mass |

| Liquid Crystal Composition A-2 | |
|---|---|
| Polymerizable compound in Table 1 | 5 parts by mass |
| The above-described Polymer C | 0.1 parts by mass |
| The above-described photopolymerization initiator A | 0.5 parts by mass |
| Cyclopentanone | 175 parts by mass |
| Methyl ethyl ketone | 50 parts by mass |
| Ethyl laurate | 10 parts by mass |

Rod-Like Liquid Crystal Compound H

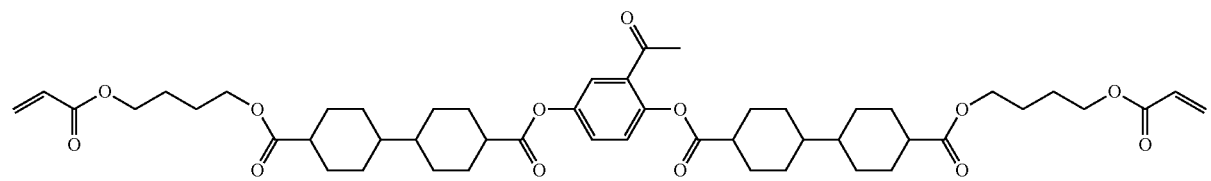 [SMILES: C=CC(=O)OCCCCOC(=O)C1CCC(C2CCC(C(=O)Oc3ccc(OC(=O)C4CCC(C5CCC(C(=O)OCCCCOC(=O)C=C)CC5)CC4)c(C(C)=O)c3)CC2)CC1]

Examples 16 to 19

Laminates and laminates with a pressure-sensitive adhesive layer were produced in the same manner as in Example 15, except that the pressure-sensitive adhesive layer was changed to pressure-sensitive adhesives shown in Table 1. Since Examples 15 to 19 are experimental examples in which only the pressure-sensitive adhesive layer is different, the laminates produced in Examples are the same.

Details of the pressure-sensitive adhesives shown in Table 1 are as follows.
Opteria: manufactured by LINTEC Corporation
SK2057: manufactured by Soken Chemical & Engineering Co., Ltd.
SK1478: manufactured by Soken Chemical & Engineering Co., Ltd.

Comparative Example 7

Laminates and laminates with a pressure-sensitive adhesive layer were produced in the same manner as in Example 1, except that the liquid crystal composition A-1 for forming the first optically anisotropic layer was changed to the following liquid crystal composition A-3.

| Liquid Crystal Composition A-3 | |
|---|---|
| The above-described rod-like liquid crystal compound A | 14.5 parts by mass |
| The above-described rod-like liquid crystal compound B | 2.2 parts by mass |
| The above-described rod-like liquid crystal compound C | 0.3 parts by mass |
| The above-described rod-like liquid crystal compound D | 39.0 parts by mass |
| The above-described rod-like liquid crystal compound E | 39.0 parts by mass |
| The following compound I | 5 parts by mass |
| The above-described Polymer C | 0.1 parts by mass |
| The above-described photopolymerization initiator A | 0.5 parts by mass |
| Cyclopentanone | 175 parts by mass |
| Methyl ethyl ketone | 50 parts by mass |
| Ethyl laurate | 10 parts by mass |

Compound I (in the following formula, Me represents a methyl group)

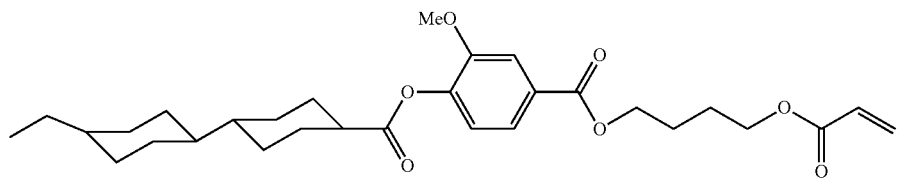 [SMILES: C=CC(=O)OCCCCOC(=O)c1ccc(OC(=O)C2CCC(C3CCC(CC)CC3)CC2)c(OC)c1]

Example 20

<Formation of Second Optically Anisotropic Layer>

A second optically anisotropic layer was formed on a support in the same manner as in Example 1, except that the liquid crystal composition C-1 for forming the second optically anisotropic layer was changed to the following liquid crystal composition C-2.

The formed second optically anisotropic layer was a positive C plate satisfying Expression (C1) nz>nx≈ny, and had a film thickness of about 0.5 μm.

| Liquid Crystal Composition C-2 | |
| --- | --- |
| The above-described rod-like liquid crystal compound A | 83 parts by mass |
| The above-described rod-like liquid crystal compound B | 15 parts by mass |
| The above-described rod-like liquid crystal compound C | 2 parts by mass |
| Acrylate monomer (A-400, manufactured by Shin-Nakamura Chemical Co., Ltd.) | 4.2 parts by mass |
| Polymer A | 2 parts by mass |
| Vertical alignment agent A | 1.9 parts by mass |
| Photopolymerization initiator A | 5.1 parts by mass |
| Polymer C | 0.8 parts by mass |
| Methyl isobutyl ketone | 567 parts by mass |

<Preparation of Alignment Film Forming Composition>

5 parts by mass (weight-average molecular weight: 30,000) of a photo-alignment polymer J having the following structure, 95 parts by mass of cyclopentanone (solvent), and 0.1 parts by mass of the photopolymerization initiator A were mixed, and the obtained mixture was stirred at 60° C. for 30 minutes to obtain a horizontal alignment film forming composition.

Photo-Alignment Polymer J

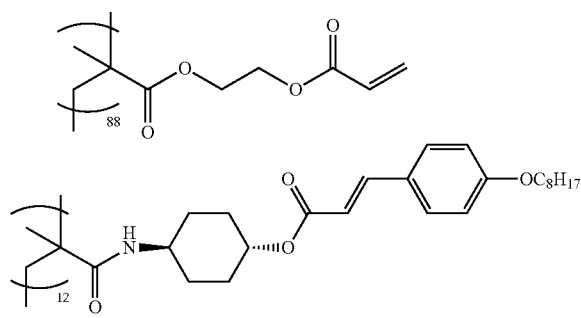

<Formation of First Optically Anisotropic Layer (Upper Layer)>

The liquid crystal cured film surface of the laminate in which the second optically anisotropic layer was formed on the support was subjected to a corona treatment, and the above-described alignment film forming composition was coated thereon with a wire bar coater, and dried at 80° C. for 1 minute.

Next, the resultant material was irradiated with 7.9 mJ/cm$^2$ of UV light (ultra-high pressure mercury lamp; UL750; manufactured by HOYA CANDEO OPTRONICS CORPORATION) (wavelength: 313 nm) passing through a wire grid polarizer at room temperature to impart an alignment function, and an alignment film having a horizontal alignment function was obtained. The obtained alignment film had a film thickness of 0.2 μm. A first optically anisotropic layer was produced in the same manner as in Example 1, except for being coated on the obtained alignment film.

<Manufacturing of Laminate with Pressure-Sensitive Adhesive Layer>

A laminate with a pressure-sensitive adhesive layer was produced in the same manner as in Example 1.

[Evaluation]

For each of the laminates produced in the experimental examples, the endothermic peak temperature was measured by the method described above, and Re(450), Re(550), Re(650), and Rth(550) were measured by the method described above.

In addition, cracks and moisture-heat resistance were evaluated by methods shown below.

The results are shown in Table 1.

[Cracks]

For each of the laminates with a pressure-sensitive adhesive layer (hereinafter, abbreviated as "samples" in this paragraph) produced in the experimental examples, a heat shock test was performed in which one cycle consisted of holding at −35° C. for 60 minutes and holding at 70° C. for 60 minutes.

The presence or absence of cracks was observed through a magnifying glass in a sample before the test and samples subjected to 50 cycles, 100 cycles, and 200 cycles, respectively, and was evaluated according to the following criteria.

A: No cracks occurred on the optically anisotropic layer in all four samples.

B: A crack of less than 1 cm occurred in one sample, but did not occur in other three samples.

C: A crack of less than 1 cm occurred in two or more samples, or a crack of 1 cm or more occurred in at least one sample.

[Moisture-Heat Resistance]

The laminates produced in the experimental examples were cut into a size of 40 mm×40 mm. The coating surface was attached to a glass plate (EAGLE XG, manufactured by Corning Inc.) with a pressure-sensitive adhesive sheet SK2057 (manufactured by Soken Chemical & Engineering Co., Ltd.) laminated thereon, and the base was peeled off to obtain a test sample. Two test samples were produced for one laminate.

After the produced samples were held for 72 hours in an environment of 100° C. and 95%, Re(550) and Rth(550) were evaluated according to the following criteria.

A: A case where both the ratio of Re(550) after holding to Re(550) before holding and the ratio of Rth(550) after holding to Rth(550) before holding are 95% or greater.

B: A case where, of the ratio of Re(550) after holding to Re(550) before holding and the ratio of Rth(550) after holding to Rth(550) before holding, one in which the rate of change is larger is 90% or greater and less than 95%.

C: A case where, of the ratio of Re(550) after holding to Re(550) before holding and the ratio of Rth(550) after holding to Rth(550) before holding, one in which the rate of change is large is less than 90%.

TABLE 1

| | Laminate | | | | | | | Pressure-Sensitive Adhesive Layer | |
|---|---|---|---|---|---|---|---|---|---|
| | First Optically Anisotropic Layer | | | | | | Second Optically Anisotropic Layer | Front Surface Side | |
| | | Polymerizable Compound | | | | | | | |
| | Liquid Crystal Composition | Type | Parts by Mass | Polymerizable Group | Number of Ring Structures | I/O Value | Molecular Weight | Liquid Crystal Composition | Product Number | Storage Elastic Modulus (MPa) |
| Comparative Example 1 | A-1 | None | — | — | — | — | — | C-1 | SK2057 | 0.08 |
| Example 1 | A-1 | M1 | 5 | Monofunctional | 1 | 0.36 | 176 | C-1 | SK2057 | 0.08 |
| Example 2 | A-1 | M2 | 5 | Monofunctional | 0 | 0.21 | 240 | C-1 | SK2057 | 0.08 |
| Example 3 | A-1 | M3 | 5 | Monofunctional | 0 | 0.26 | 198 | C-1 | SK2057 | 0.08 |
| Example 4 | A-1 | M4 | 5 | Monofunctional | 1 | 0.65 | 192 | C-1 | SK2057 | 0.08 |
| Example 5 | A-1 | M5 | 5 | Bifunctional | 0 | 0.74 | 256 | C-1 | SK2057 | 0,08 |
| Example 6 | A-1 | M6 | 5 | Bifunctional | 0 | 1.22 | 302 | C-1 | SK2057 | 0.08 |
| Example 7 | A-1 | M7 | 5 | Bifunctional | 0 | 1.51 | 523 | C-1 | SK2057 | 0.08 |
| Example 8 | A-1 | M8 | 5 | Bifunctional | 0 | 1.64 | 743 | C-1 | SK2057 | 0.08 |
| Example 9 | A-1 | M9 | 5 | Bifunctional | 0 | 0.52 | 226 | C-1 | SK2057 | 0.08 |
| Example 10 | A-1 | M10 | 5 | Bifunctional | 0 | 0.52 | 226 | C-1 | SK2057 | 0.08 |
| Example 11 | A-1 | M11 | 5 | Bifunctional | 0 | 0.41 | 268 | C-1 | SK2057 | 0.08 |
| Comparative Example 2 | A-1 | CM1 | 5 | Bifunctional | 2 | 0.31 | 332 | C-1 | SK2057 | 0.08 |
| Comparative Example 3 | A-1 | CM2 | 5 | Bifunctional | 5 | 0.45 | 547 | C-1 | SK2057 | 0.08 |
| Comparative Example 4 | A-1 | CM3 | 5 | Trifunctional | 0 | 0.62 | 296 | C-1 | SK2057 | 0.08 |
| Comparative Example 5 | A-1 | CM4 | 5 | Tetrafunctional | 0 | 0.73 | 352 | C-1 | SK2057 | 0.08 |
| Comparative Example 6 | A-1 | CM5 | 5 | Hexafunctional | 0 | 0.64 | 835 | C-1 | SK2057 | 0.08 |
| Example 12 | A-2 | M1 | 5 | Monofunctional | 1 | 0.36 | 176 | C-1 | SK2057 | 0.08 |
| Example 13 | A-2 | M2 | 5 | Monofunctional | 0 | 0.21 | 240 | C-1 | SK2057 | 0.08 |
| Example 14 | A-2 | M3 | 5 | Monofunctional | 0 | 0.26 | 198 | C-1 | SK2057 | 0.08 |
| Example 15 | A-2 | M10 | 5 | Bifunctional | 0 | 0.52 | 226 | C-1 | SK2057 | 0.08 |
| Example 16 | A-2 | M10 | 5 | Bifunctional | 0 | 0.52 | 226 | C-1 | Opteria | 0.15 |
| Example 17 | A-2 | M10 | 5 | Bifunctional | 0 | 0.52 | 226 | C-1 | SK1478 | 0.11 |
| Example 18 | A-2 | M10 | 5 | Bifunctional | 0 | 0.52 | 226 | C-1 | SK2057 | 0.08 |
| Example 19 | A-2 | M10 | 5 | Bifunctional | 0 | 0.52 | 226 | C-1 | SK2057 | 0.08 |
| Comparative Example 7 | A-3 | None | — | — | — | — | — | C-1 | SK2057 | 0.08 |
| Example 20 | A-1 | M1 | 5 | Monofunctional | 1 | 0.36 | 176 | C-2 | SK2057 | 0.08 |

| | Pressure-Sensitive Adhesive Layer Rear Surface Side | | Various Physical Property Values of Laminate | | | | | Evaluation | |
|---|---|---|---|---|---|---|---|---|---|
| | Product Number | Storage Elastic Modulus (MPa) | Endothermic Peak Temperature (°C.) | Re (550) | Rth (550) | Re(450)/ Re(550) | Re(650)/ Re(550) | Cracks | Moisture-Heat Resistance |
| Comparative Example 1 | SK2057 | 0.08 | 126 | 154 | 27 | 0.85 | 1.03 | C | A |
| Example 1 | SK2057 | 0.08 | 121 | 155 | 28 | 0.84 | 1.03 | B | A |
| Example 2 | SK2057 | 0.08 | 120 | 155 | 27 | 0.85 | 1.03 | B | A |
| Example 3 | SK2057 | 0.08 | 123 | 154 | 27 | 0.85 | 1.03 | B | A |
| Example 4 | SK2057 | 0.08 | 122 | 153 | 27 | 0.85 | 1.03 | B | B |
| Example 5 | SK2057 | 0,08 | 125 | 153 | 27 | 0.85 | 1.03 | B | B |
| Example 6 | SK2057 | 0.08 | 118 | 150 | 25 | 0.85 | 1.03 | B | C |
| Example 7 | SK2057 | 0.08 | 116 | 143 | 21 | 0.85 | 1.03 | A | C |
| Example 8 | SK2057 | 0.08 | 115 | 142 | 21 | 0.85 | 1.03 | A | C |
| Example 9 | SK2057 | 0.08 | 121 | 154 | 27 | 0.85 | 1.03 | B | A |
| Example 10 | SK2057 | 0.08 | 122 | 155 | 28 | 0.85 | 1.03 | B | A |
| Example 11 | SK2057 | 0.08 | 123 | 150 | 25 | 0.85 | 1.03 | B | A |
| Comparative Example 2 | SK2057 | 0.08 | 129 | 143 | 21 | 0.85 | 1.03 | C | A |
| Comparative Example 3 | SK2057 | 0.08 | 130 | 141 | 20 | 0.86 | 1.03 | C | A |
| Comparative Example 4 | SK2057 | 0.08 | 126 | 150 | 25 | 0.84 | 1.03 | C | B |

TABLE 1-continued

| | | | | | | | | | |
|---|---|---|---|---|---|---|---|---|---|
| Comparative Example 5 | SK2057 | 0.08 | 128 | 143 | 22 | 0.85 | 1.03 | C | B |
| Comparative Example 6 | SK2057 | 0.08 | 128 | 139 | 20 | 0.85 | 1.03 | C | B |
| Example 12 | SK2057 | 0.08 | 121 | 148 | 24 | 0.82 | 1.04 | B | A |
| Example 13 | SK2057 | 0.08 | 121 | 148 | 24 | 0.82 | 1.04 | B | A |
| Example 14 | SK2057 | 0.08 | 121 | 148 | 24 | 0.82 | 1.04 | B | A |
| Example 15 | SK2057 | 0.08 | 122 | 148 | 24 | 0.82 | 1.04 | B | A |
| Example 16 | SK2057 | 0.08 | 120 | 148 | 24 | 0.82 | 1.04 | A | A |
| Example 17 | SK2057 | 0.08 | 120 | 148 | 24 | 0.82 | 1.04 | A | A |
| Example 18 | Opteria | 0.15 | 120 | 148 | 24 | 0.82 | 1.04 | A | A |
| Example 19 | SK1478 | 0.11 | 120 | 148 | 24 | 0.82 | 1.04 | A | A |
| Comparative Example 7 | SK2057 | 0.08 | 130 | 157 | 28 | 0.82 | 1.04 | C | A |
| Example 20 | SK2057 | 0.08 | 121 | 155 | 28 | 0.84 | 1.03 | B | A |

The structures of the polymerizable compounds in Table 1 are shown below.

Polymerizable Compound M1

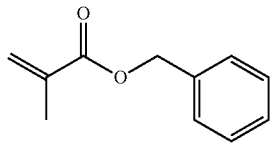

Polymerizable Compound M2

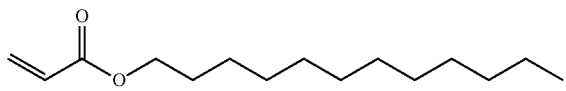 [SMILES: C=CC(=O)OCCCCCCCCCCCC]

Polymerizable Compound M3

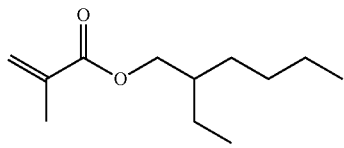

Polymerizable Compound M4

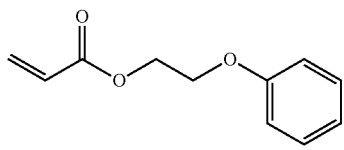

Polymerizable Compound M5

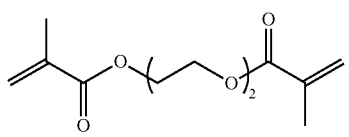

Polymerizable Compound M6

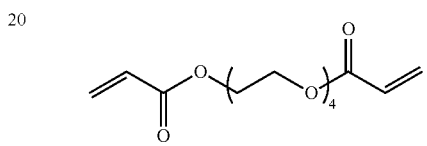

Polymerizable Compound M7

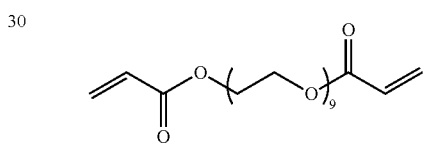

Polymerizable Compound M8

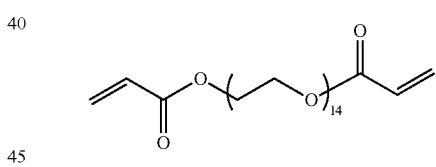

Polymerizable Compound M9

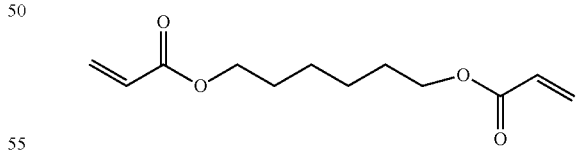

Polymerizable Compound M10

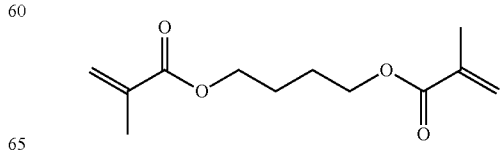

Polymerizable Compound M11
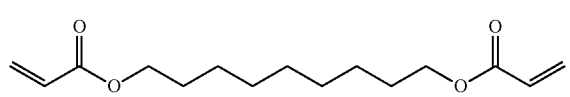 [SMILES: C=CC(=O)OCCCCCCCCCOC(=O)C=C]
Polymerizable Compound CM1
Polymerizable Compound CM3
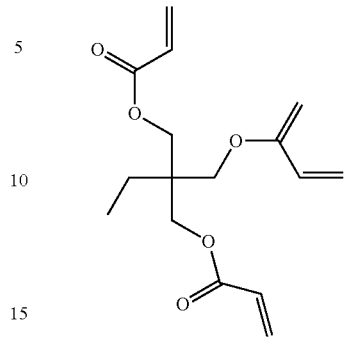
Polymerizable Compound CM2
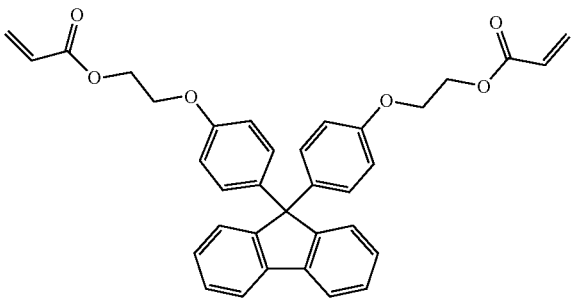 [SMILES: C=CC(=O)OCCOc1ccc(C2(c3ccc(OCCOC(=O)C=C)cc3)c3ccccc3-c3ccccc32)cc1]
Polymerizable Compound CM4
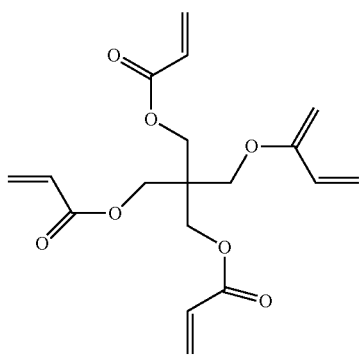 [SMILES: C=CC(=C)OCC(COC(=O)C=C)(COC(=O)C=C)COC(=O)C=C]
Polymerizable Compound CM5
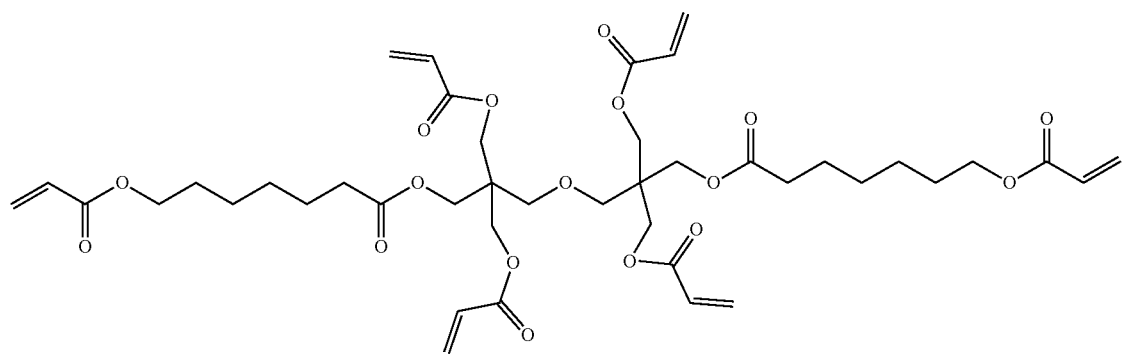 [SMILES: C=CC(=O)OCCCCCCC(=O)OCC(COCC(COC(=O)C=C)(COC(=O)C=C)COC(=O)CCCCCCOC(=O)C=C)(COC(=O)C=C)COC(=O)C=C]

From the results shown in Table 1, it has been found that in a case where the endothermic peak temperature observed in the laminate is higher than 125° C., a crack of less than 1 cm occurs in two or more samples, or a crack of 1 cm or more occurs in at least one sample (Comparative Examples 1 to 7).

In contrast, it has been found that in a case where the endothermic peak temperature observed in the laminate is 125° C. or lower, the occurrence of cracks is suppressed more than in Comparative Examples 1 to 9 (Examples 1 to 20).

In particular, from the comparison of Examples 5 to 11, it has been found that in a case where the first optically anisotropic layer is the specific optically anisotropic layer and the I/O value of the polymerizable compound (specific polymerizable monomer) is 0.8 or less, the moisture-heat resistance of the laminate is improved.

In addition, from the comparison of Examples 15 to 19, it has been found that in a case where at least one of the pressure-sensitive adhesive layers has a storage elastic modulus of 0.1 MPa or greater at 25° C., the occurrence of cracks is further suppressed.

What is claimed is:

1. A laminate comprising:
   a first optically anisotropic layer; and
   a second optically anisotropic layer, the first optically anisotropic layer and the second optically anisotropic layer being laminated directly or through an alignment film,
   wherein the first optically anisotropic layer satisfies Expression (A),
   the second optically anisotropic layer satisfies Expression (B),
   the laminate satisfies Expressions (1) to (5),
   an endothermic peak temperature of the laminate observed by differential scanning calorimetry is 125° C. or lower,
   wherein at least one of the first optically anisotropic layer or the second optically anisotropic layer is a layer formed of a liquid crystal composition containing a liquid crystal compound and a polymerizable compound,
   the liquid crystal compound is a liquid crystal compound having reverse wavelength dispersibility, and
   the polymerizable compound is a polymerizable compound having one or two polymerizable groups and having no ring structure or one ring structure in a molecule, $$nx > ny \quad \text{Expression (A)}$$

$$nx < nz \quad \text{Expression (B)}$$

$$100 \text{ nm} \leq Re(550) \leq 180 \text{ nm} \quad \text{Expression (1)}$$

$$Re(450)/Re(550) < 1.0 \quad \text{Expression (2)}$$

$$Re(650)/Re(550) > 1.0 \quad \text{Expression (3)}$$

$$-40 \text{ nm} \leq Rth(550) \leq 70 \text{ nm} \quad \text{Expression (4)}$$

$$Rth(550) < Re(550)/2 \quad \text{Expression (5)}$$

in Expressions (A) and (B), nx represents, in an index ellipsoid formed of an optically anisotropic layer, a principal refractive index in a direction parallel to a plane of the optically anisotropic layer, ny represents a refractive index in a direction parallel to the plane of the optically anisotropic layer and perpendicular to a direction of nx, and nz represents a refractive index in a direction perpendicular to the plane of the optically anisotropic layer, and in Expressions (1) to (5), Re (450) represents an in-plane retardation at a wavelength of 450 nm, Re (550) represents an in-plane retardation at a wavelength of 550 nm, Re (650) represents an in-plane retardation at a wavelength of 650 nm, and Rth (550) represents a thickness direction retardation at a wavelength of 550 nm.

2. The laminate according to claim 1,
   wherein the polymerizable compound has a molecular weight of 150 or greater and 1,000 or less.

3. The laminate according to claim 1,
   wherein an I/O value of the polymerizable compound is 0.8 or less.

4. The laminate according to claim 1,
   wherein the first optically anisotropic layer is a positive A plate.

5. The laminate according to claim 1,
   wherein the second optically anisotropic layer is a positive C plate.

6. A laminate with a pressure-sensitive adhesive layer, comprising:
   the laminate according to claim 1; and
   a pressure-sensitive adhesive layer laminated on both surfaces of the laminate.

7. The laminate with a pressure-sensitive adhesive layer according to claim 6,
   wherein at least one of the pressure-sensitive adhesive layers is a pressure-sensitive adhesive layer having a storage elastic modulus of 0.1 MPa or greater at 25° C.

8. A polarizing plate comprising:
   the laminate according to claim 1; and
   a polarizer.

9. An image display device comprising:
   the laminate according to claim 1.

10. The laminate according to claim 1,
    wherein the polymerizable compound is a compound represented by Formula (IA) or Formula (IB), $$P\text{—}R \quad \text{Formula (IA)}$$

$$P\text{-}L\text{-}P \quad \text{Formula (IB)},$$

here, in Formula (IA) and Formula (IB), P represents a polymerizable group,
in Formula (IA), R represents an alkyl group which may contain an oxygen atom, an aromatic hydrocarbon group, or a combination thereof, and
in Formula (IB), L represents an alkylene group which may contain an oxygen atom.

* * * * *